(12) United States Patent
Hirai

(10) Patent No.: US 7,872,957 B2
(45) Date of Patent: Jan. 18, 2011

(54) OPTICAL PICKUP AND OPTICAL DATA PROCESSING DEVICE USING THE SAME

(75) Inventor: Hideaki Hirai, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 110 days.

(21) Appl. No.: 12/403,666

(22) Filed: Mar. 13, 2009

(65) Prior Publication Data

US 2009/0231981 A1    Sep. 17, 2009

(30) Foreign Application Priority Data

Mar. 14, 2008    (JP) .............................. 2008-065722

(51) Int. Cl.
*G11B 7/135*    (2006.01)
(52) U.S. Cl. ........................... 369/112.03; 369/112.07; 369/112.12; 369/112.23
(58) Field of Classification Search ............ 369/112.03, 369/112.07, 112.12, 112.23
See application file for complete search history.

(56) References Cited

U.S. PATENT DOCUMENTS

| | | | |
|---|---|---|---|
| 6,339,562 B1 * | 1/2002 | Sakai | 369/44.23 |
| 7,139,235 B2 * | 11/2006 | Nakanishi et al. | 369/112.04 |
| 7,197,003 B2 | 3/2007 | Hirai et al. | |
| 7,327,661 B2 * | 2/2008 | Ohnishi et al. | 369/112.03 |
| 7,345,967 B2 | 3/2008 | Hirai | |
| 7,385,906 B2 | 6/2008 | Hirai | |
| 7,450,486 B2 | 11/2008 | Hirai | |
| 7,609,607 B2 * | 10/2009 | Kim | 369/112.12 |
| 2003/0053393 A1 * | 3/2003 | Shimano et al. | 369/112.02 |
| 2006/0198254 A1 | 9/2006 | Hirai et al. | |
| 2007/0030770 A1 | 2/2007 | Hirai | |
| 2007/0133372 A1 | 6/2007 | Hirai | |

(Continued)

FOREIGN PATENT DOCUMENTS

JP    7-272303    10/1995

(Continued)

OTHER PUBLICATIONS

Katayama et al., Reduction of Interlayer Crosstalk in Dual Layer Optical Disks Using Patterned Phase Plate 13th Microoptics Conference (MOC '07), Sunport Takamatsu, Kagawa, Japan, Oct. 28-31, 2007, pp. 8-9.

*Primary Examiner*—Wayne R Young
*Assistant Examiner*—Linh T Nguyen
(74) *Attorney, Agent, or Firm*—Dickstein Shapiro LLP

(57) ABSTRACT

An optical pickup including a light source, a light focus device, a diffraction element, an optical split element, a ¼ wavelength board, a light reception device and a correction element wherein the correction element is divided into multiple areas in a surface vertical to an optical axis, each area of the multiple areas has a sub-wavelength convexo-concave structure having a pitch equal to or shorter than a wavelength of the outgoing light beam and the sub-wavelength convexo-concave structures of the multiple areas adjacent to each other have groove directions perpendicular to each other, and the filling factors of adjacent areas of the multiple areas are determined to substantially equalize effective refractive indices with regard to the polarization direction of the outgoing beam emitted from the light source and impart a phase difference of $\pi$ with regard to a polarization direction perpendicular to the polarization direction of the outgoing beam.

3 Claims, 23 Drawing Sheets

U.S. PATENT DOCUMENTS

| | | |
|---|---|---|
| 2007/0147216 A1 | 6/2007 | Hirai |
| 2007/0217011 A1 | 9/2007 | Kiyosawa et al. |
| 2007/0223350 A1 | 9/2007 | Hirai |
| 2008/0008078 A1 | 1/2008 | Hirai |
| 2008/0106789 A1 | 5/2008 | Hirai et al. |
| 2008/0192613 A1* | 8/2008 | Mori ..................... 369/112.23 |
| 2009/0129235 A1* | 5/2009 | Yanagisawa et al. ... 369/112.03 |

FOREIGN PATENT DOCUMENTS

| | | |
|---|---|---|
| JP | 2006-252716 | 9/2006 |
| JP | 2006-277894 | 10/2006 |
| JP | 2006-309807 | 11/2006 |

* cited by examiner

FIG. 4
(a)
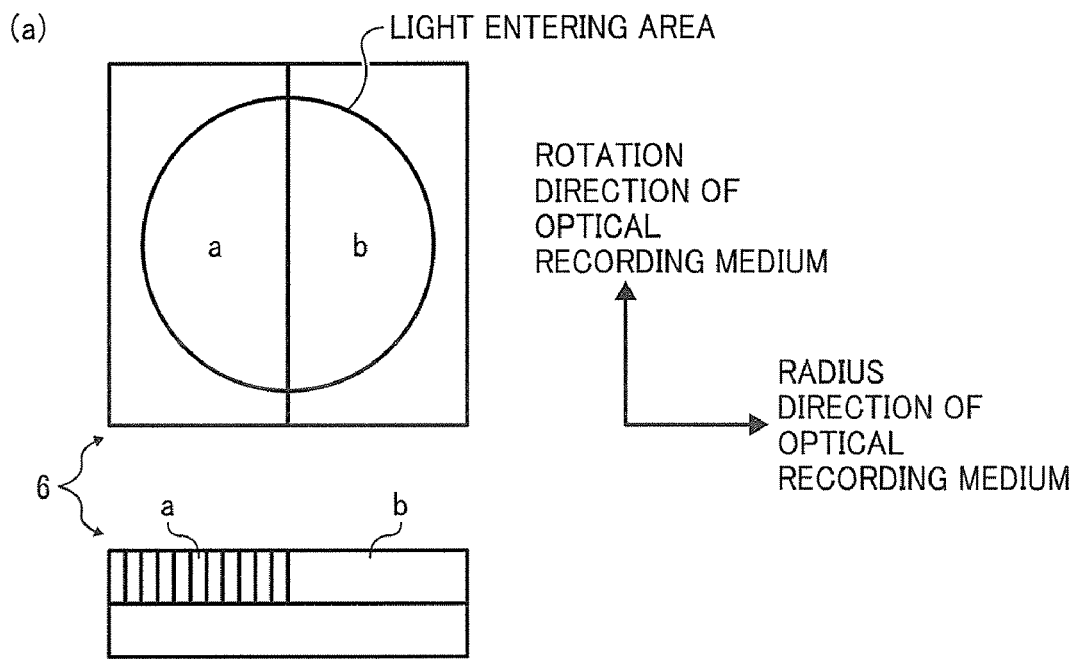
(b)
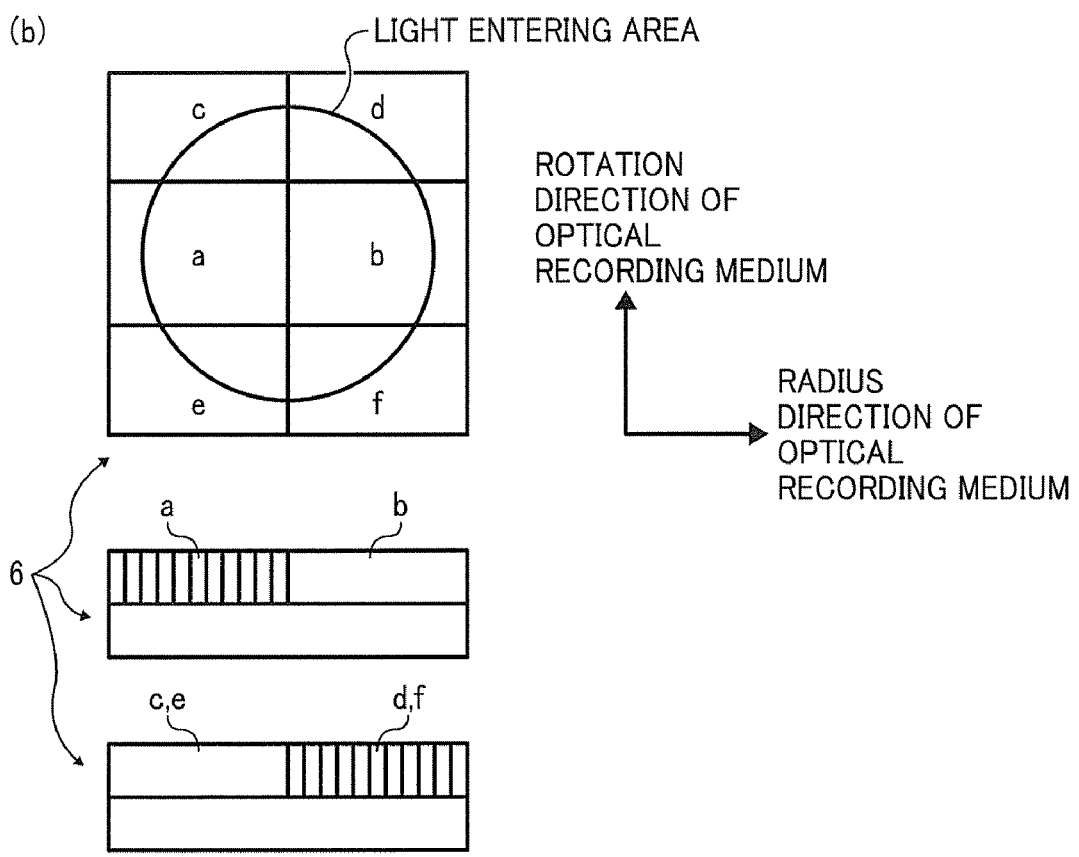

FIG. 5
(a) L1 LAYER
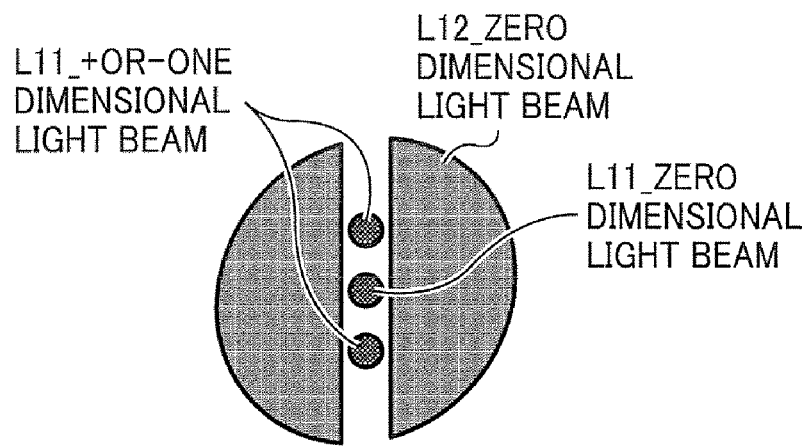
(b) L2 LAYER
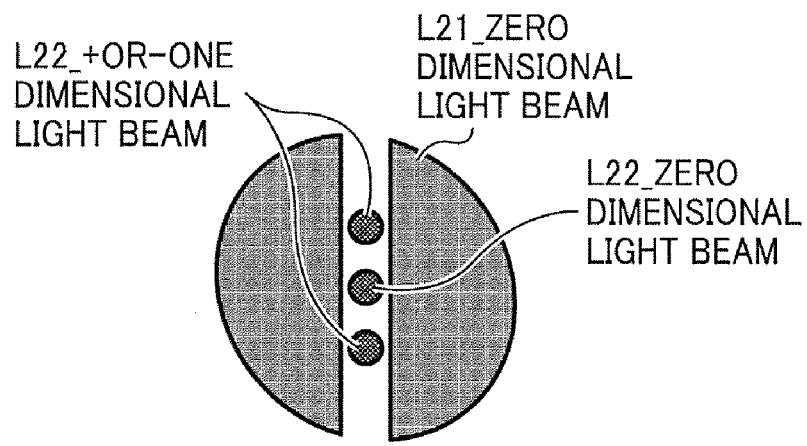

FIG. 10
(a) 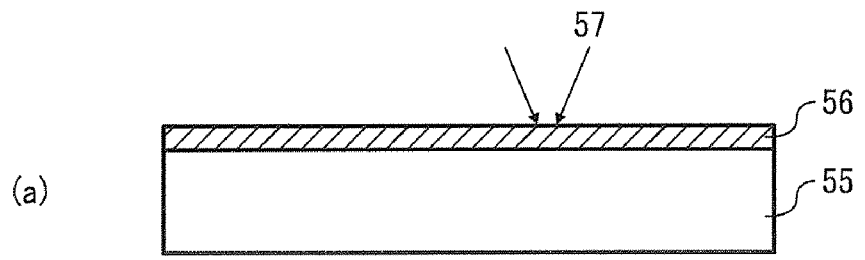
(b) 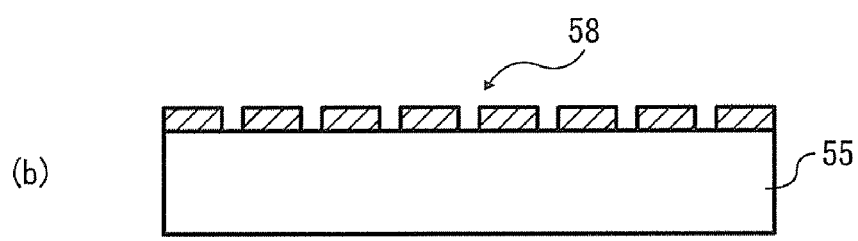
(c) 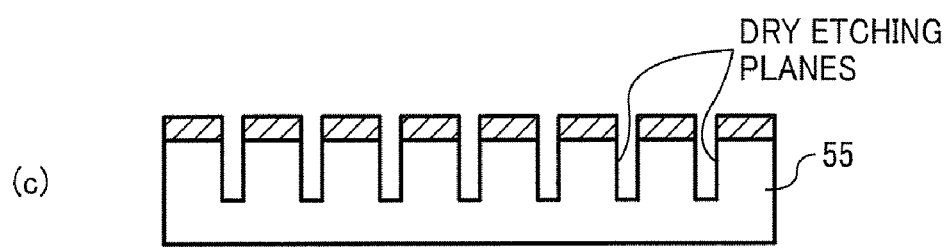
(d) 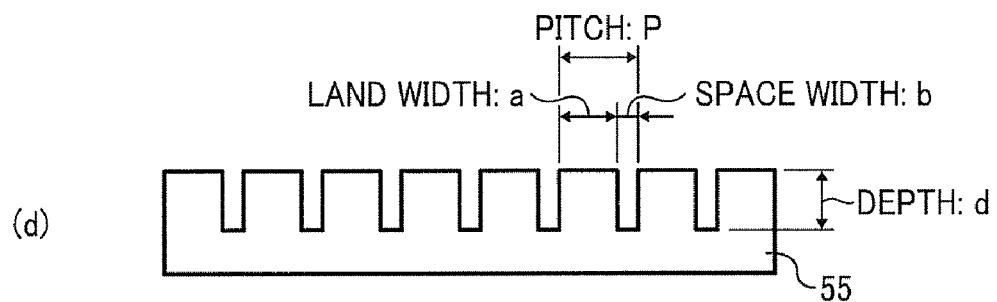

FIG. 11
(a) 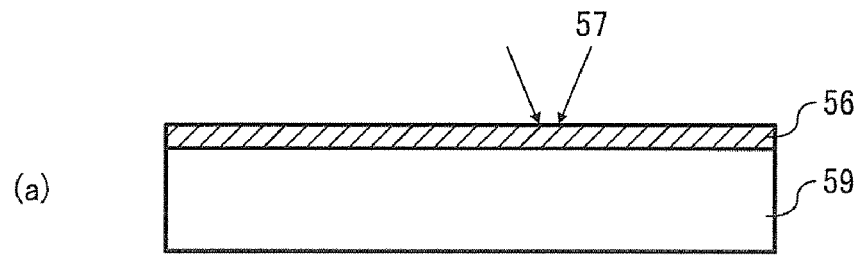
(b) 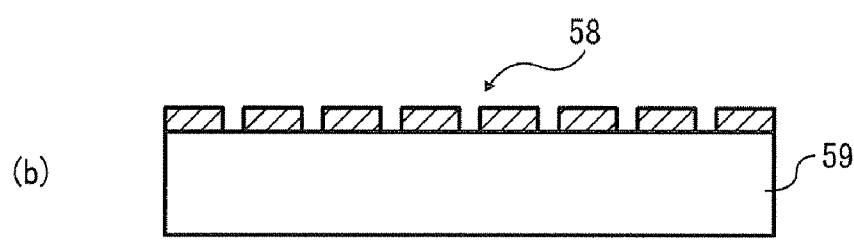
(c) 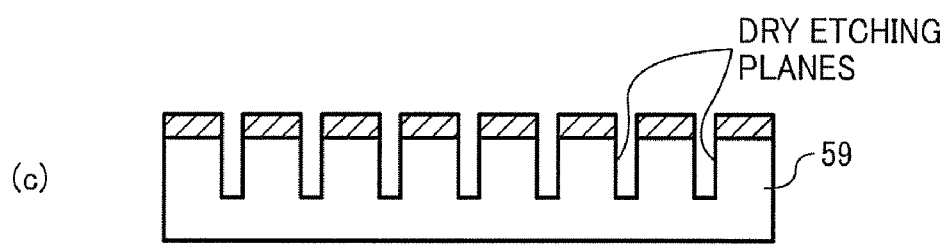
(d) 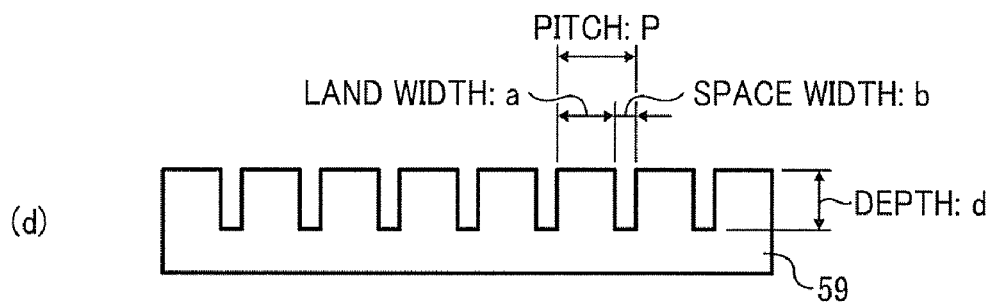

FIG. 20
BACKGROUND ART
(a) L1 LAYER
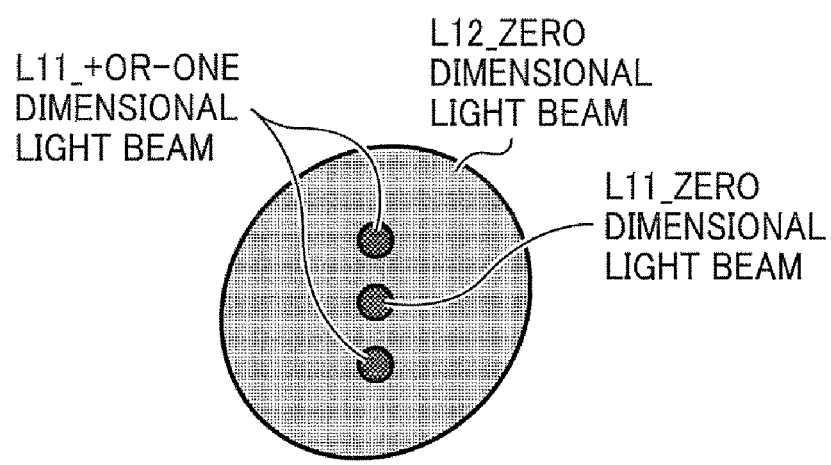
(b) L2 LAYER
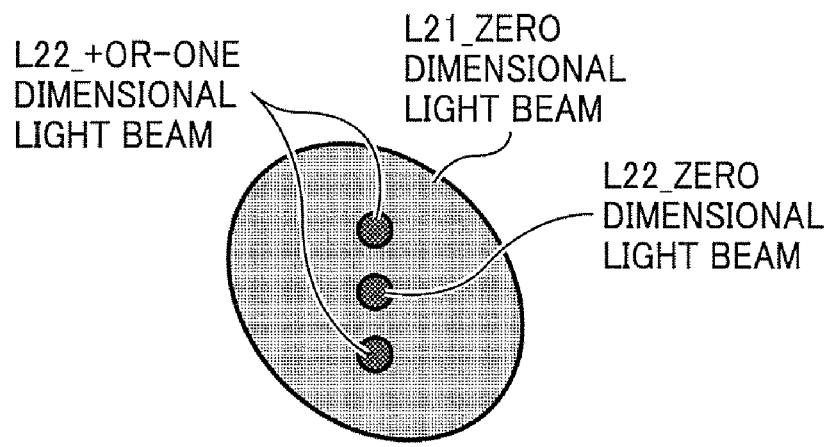

FIG. 21
BACKGROUND ART
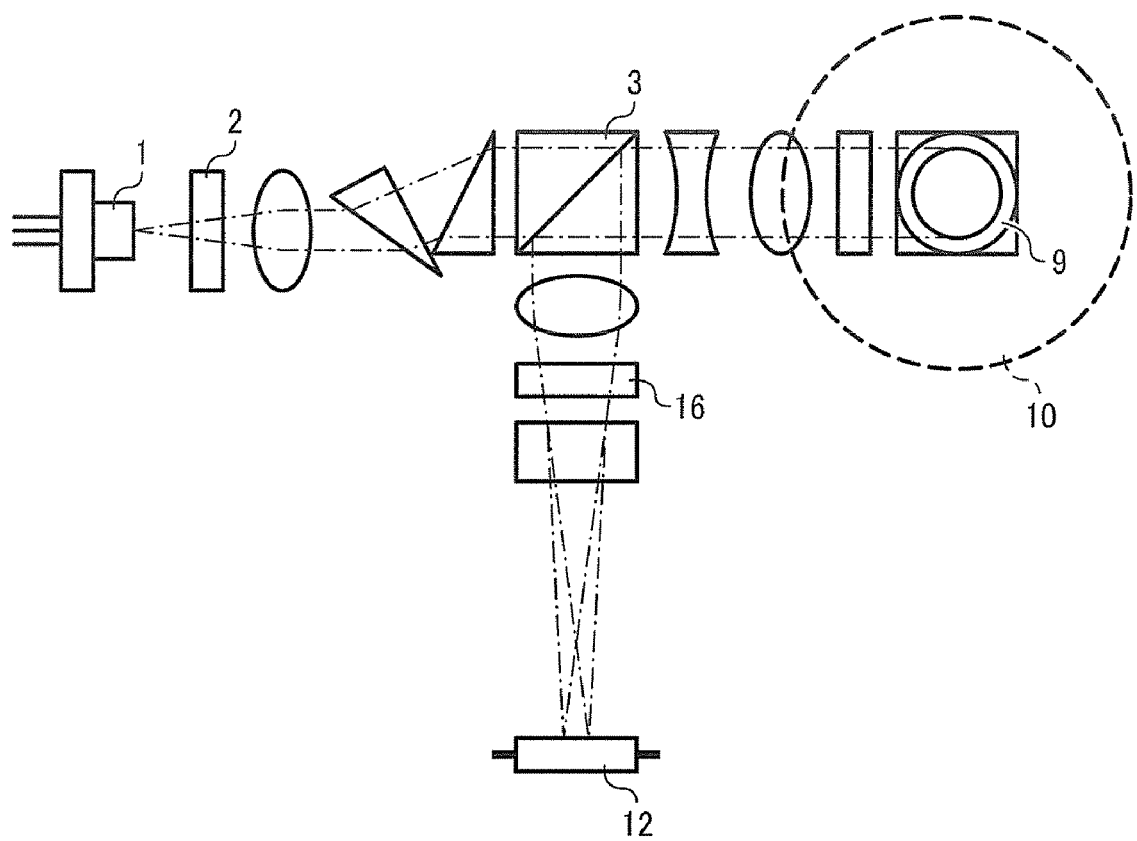
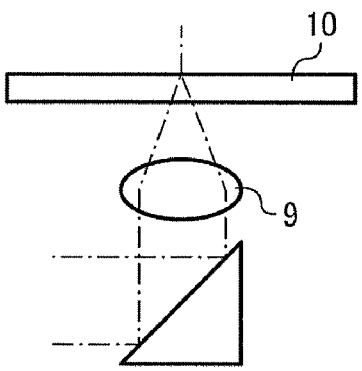

FIG. 22
BACKGROUND ART
(a)
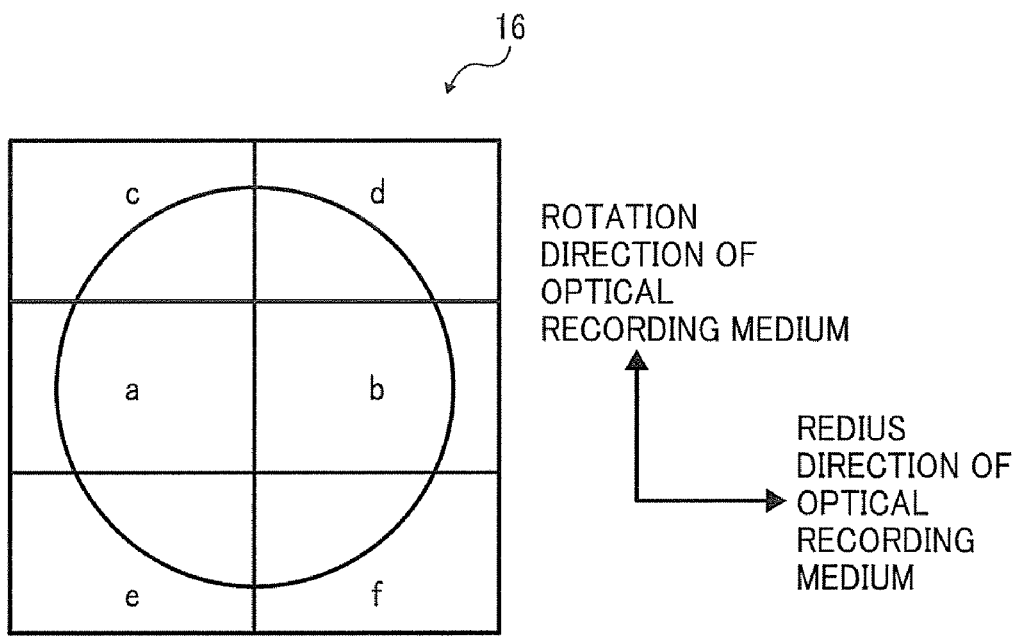
(b)
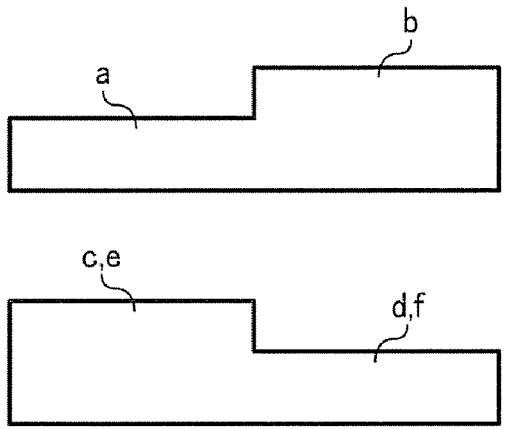

FIG. 23
BACKGROUND ART
(a)
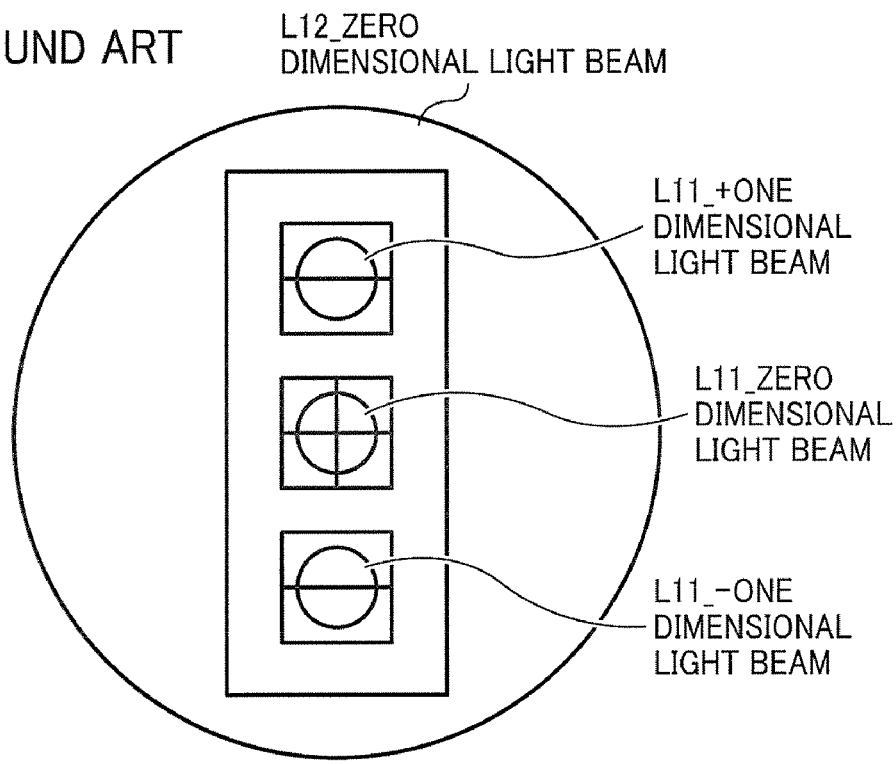
(b)
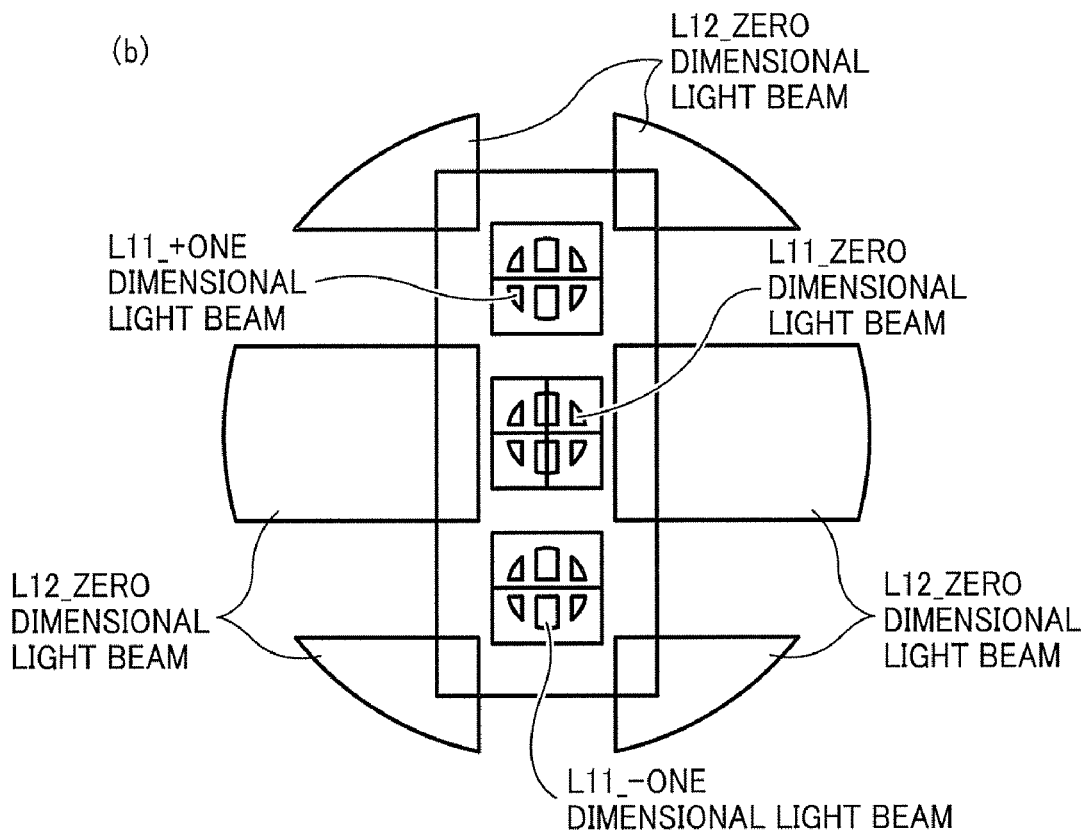

FIG. 24
BACKGROUND ART
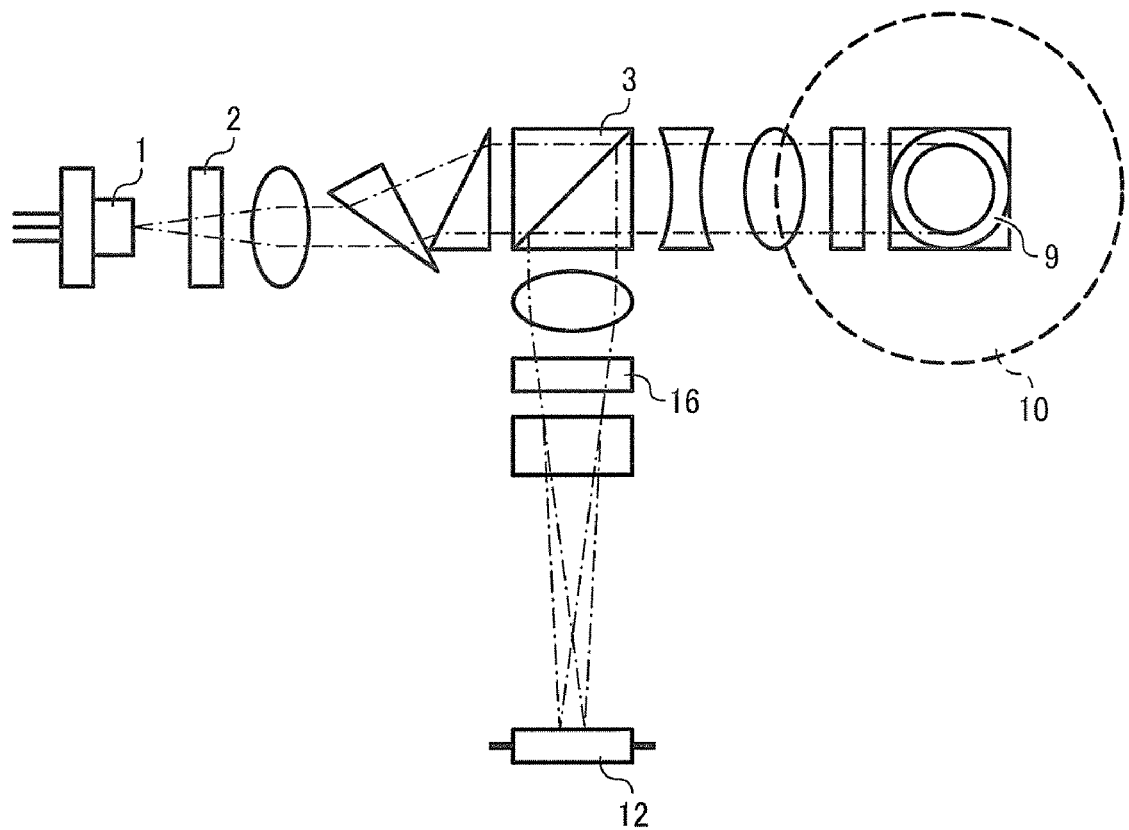
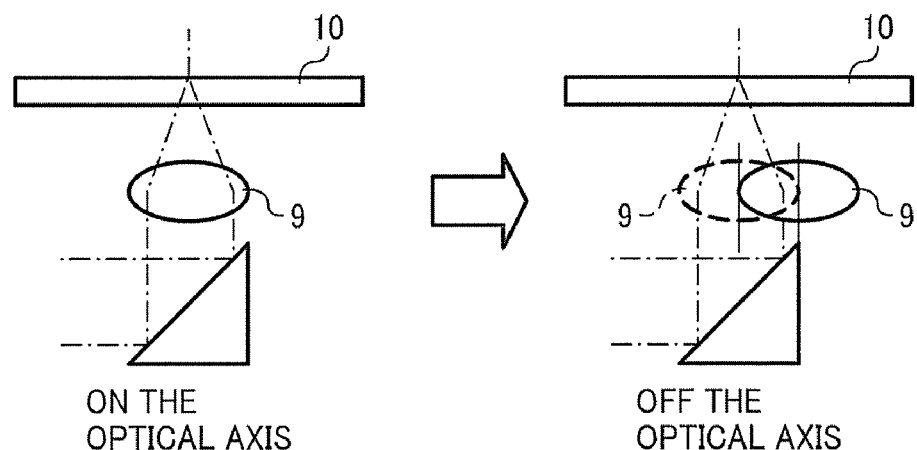
ON THE
OPTICAL AXIS
OFF THE
OPTICAL AXIS

US 7,872,957 B2

OPTICAL PICKUP AND OPTICAL DATA PROCESSING DEVICE USING THE SAME

BACKGROUND OF THE INVENTION

1. Field of the Invention

The present invention relates to an optical pickup including an optical element, and more particularly to an optical pickup which prevents deterioration of track error signals ascribable to adjacent layers when recording or playing data recorded on an optical recording medium having multiple recording layers, and an optical data processing device using the optical pickup.

2. Discussion of the Background

An optical pickup typically has a structure which detects focus error signals and track error signals and controls the position of an objective lens by using these error signals to correctly irradiate a predetermined recording track in an optical recording medium. With regard to the detection of track error signals, a 3-spot system, a push-pull system, and a differential push-pull system (hereinafter referred to as the DPP system or simply DPP) are typical well known examples.

In particular, the DPP system uses a relatively simple optical system with highly sensitive track error signal detection. In addition, the DPP system has an advantage in that it can detect relatively reliable track error signals in which any offset of the track error signals ascribable to displacement of the objective lens or tilt of the optical recording medium is suitably removed.

Track error signal detection using the DPP system is briefly described. An optical pickup which employs the DPP system includes, for example, a diffraction element 23 arranged between a semiconductor laser 1 as the light source and a half mirror 23 as illustrated in FIG. 16. The diffraction element 2 includes, for example, straight grooves engraved in the surface thereof at a constant pitch, that is, with a regular, uniform gap between the grooves as illustrated in FIG. 17, and has a function of splitting a light beam emitted from the semiconductor laser 1 by diffraction into at least three light beams, i.e., + or − one dimensional light beam, and zero dimensional light beam.

These three light beams are independently focused by way of the half mirror 23, a collimate lens 4, and an objective lens 9 to form three focus spots 100, 101, and 102 on the signal recording face of an optical recording medium 10 as illustrated in (a) of FIG. 18A. The irradiation positions of these three spots 100, 101, and 102 are adjusted by, for example, controlling rotation of the diffraction element 2 around the optical axis such that an interval δ between centerlines of the irradiate positions in the radial direction of the optical recording medium 10, i.e., the direction perpendicular to a guiding groove 110 provided in a cyclical manner on the recording surface of the optical recording medium 10, is substantially equal to ½ of the pitch TP of the guide groove 110 (hereinafter, this guide groove pitch TP is referred to as track pitch). The reflected light beams from the focus spots 100, 101, and 102 on the optical recording medium 10 reach the objective lens 9, the collimate lens 4 and the half mirror 23 again. A portion of the reflected light beams transits the half mirror 23 and enters a light reception element 12 via a detection lens 11.

The light reception element 12 has reception portions 20a, 20b and 20c, which are three half- or quarter-reception portions. The reflected light beams of the optical recording medium 10 independently strike predetermined reception surfaces of the reception portions 20a, 20b, and 20c to form detection light spots 200, 201 and 202. The photoelectric conversion signals from these reception surfaces are subjected to subtraction treatment by subtractors 50a, 50b, and 50c to detect the track error signals (hereinafter referred to as push-pull signals) by the push-pull signal system.

The detected light spots corresponding to the main focus spot 100 and the sub focus spots 101 and 102 focused on the recording medium 30 are represented by the detected light spots 200, 201 and 202, respectively. The push-pull signals obtained from the detection spots 200, 201 and 202 are represented by Sa, Sb and Sc. From the relative positions of the focus spots 100, 101, and 102 on the optical recording medium 30, it is apparent that the push-pull signals Sa, on the one hand, and Sb and Sc on the other are about 180° out of phase from each other. With regard to the push-pull signals, Sa and Sb, and Sa and Sc, are output with the signal waveforms reversed (Sb and Sc are the same phase). Therefore, when the addition signal of the signals Sb and Sc is subtracted from the signal Sa, the signal component is not negated but on the contrary is amplified.

On the other hand, displacement of the objective lens 9 or tilt of the optical recording medium 10 causes a predetermined offset component in each push-pull signal. This offset component is obviously independent of the focus spot positions on the optical recording medium 10 and occurs to Sa, Sb and Sc with the same polarity. Therefore, the offset components contained in each push-pull signal selectively cancel each other out in the subtraction treatment described above. As a result, only the offset component is completely removed or significantly reduced so that a good track error signal can be detected.

Thus, for example, the push-pull signals Sb and Sc of (b) of FIG. 18 are added by an adder 51 and the signals thereafter are suitably amplified by an amplifier 52 followed by subtraction treatment from the push-pull signal Sa of the main optical spot 100 by a subtractor 53. Therefore, the offset component contained in the push-pull signal Sa is completely removed or significantly reduced, which leads to output of a suitably amplified track error signal.

A double layer optical recording medium having two data recording layers was invented as a device to increase the storage of optical recording media. Such a double layer optical recording medium has a layer (L1) which is close to the light incident face of the double layer optical recording medium and a layer (L2) which is relatively far from the light incident face. Thus, not only a layer positioned on the focus of the objective lens but also the adjacent layer thereto has an impact on a return light beam. This is referred to as cross talk between layers. Ideally, the optical pickup should be free from effects of cross-talk between layers on servo signals.

To take a specific examples, FIG. 19 is a diagram illustrating a light path when playing data signals on a double layer optical recording medium. With reference to FIG. 19, a light beam L12 reflected at the layer L2 has a focus positioned ahead of that of a light beam L11 received at the light reception element 12 when playing (reading) data signals on the layer L1 closer to the light incident face. On the other hand, a light beam L21 reflected at the layer L1 has a focus positioned behind that of the light beam L11 received at the light reception element 12 when playing data signals on the layer L2.

(a) of FIG. 20 is a diagram illustrating light amount distribution focused on the light reception element when playing data signals on the L1 layer. (b) of FIG. 20 is a diagram illustrating light amount distribution focused on the light reception element when playing data signals on the L2 layer. In (a) of FIG. 20, L11_zero dimensional light beam, L11_+ or − one dimensional light beam, and L12_zero dimensional light beam represent a zero dimensional light beam reflected at the L1 layer, + or − one dimensional light beam reflected at the L1 layer, and a zero dimensional light beam reflected at the L2 layer, respectively, when playing data signals on the L1 layer. In (b) of FIG. 20, L22_zero dimensional light beam, L22_+ or − one dimensional light beam, L21_zero dimensional light beam represent a zero dimensional light beam reflected at the L2 layer, + or − one dimensional light reflected at the L2 layer, and a zero dimensional light beam reflected at the L1 layer, respectively, when playing data signals on the L2 layer.

Generally, a diffraction element for DPP diffracts a light beam with a ratio of zero dimensional light beam, + one dimensional beam, and − one dimensional beam of 10:1:1 with regard to the amount of light diffracted. The interfering light beams from the adjacent layer, i.e., L12_zero dimensional light beam and the L21_zero dimensional light beam, which overlap with the L11_+ or − one dimensional light and the L22_+ or − one dimensional light beam, exceeds an ignorable level in terms of the amount of light. As a result, L12_zero dimensional light beam has an impact on the DPP signal created by the L11_zero dimensional light beam and L_+ or − one dimensional light beam. Similarly, L21_zero dimensional light beam has an impact on the DPP signal created by the L22_zero dimensional light beam and L22_+ or − one dimensional light beam.

In particular, when L12_zero dimensional light beam and the L21_zero dimensional light beam are caused to vary due to variation in thickness between layers, a phenomenon in which track error signals vary arises. As a resulta, precise tracking servo is not possible.

A technology to reduce the occurrence of such cross talk between layers is known in which an optical element is provided to reduce the amount of interfering light beams ascribable to adjacent layers received at the light reception element. FIG. 21 is a diagram illustrating the structure of such an optical system.

The light beam emitted from a semiconductor 1 is focused on the target recording layer of an optical recording medium 10 by a objective lens 9 by way of a diffraction element 2 which diffracts an incident light beam into three beams. The reflected light beam from the target recording layer is detected via the objective lens 9 again by a light reception element 12. In the middle of the course of the light beam, there are provided an outward path to the optical recording medium 10 and a beam splitter 3 which splits the reflected light from the optical recording medium 10 to the light reception element 12. Also, an optical element 16 which reduces the amount of an interfering light beam caused by an adjacent layer received at the light reception element 12 is provided between the beam splitter 3 and the light reception element 12.

The optical element 16 is an element which imparts a phase step to prevent a light beam reflected at the adjacent layer from entering into the light reception element 12 for the optical recording medium 10 (where the optical recording medium has multiple recording layers on one side). (a) of FIG. 22 is a diagram illustrating a front view from the incident light side, and (b) of FIG. 22 is a diagram illustrating a cross section of the optical element 16. As illustrated in (a) of FIG. 22, the optical element 16 is formed of 6 areas of a, b, c, d, e, and f and the areas of b, c and e have a phase step imparting a phase difference of $\pi$ to the areas of a, d and f.

In addition, (a) and (b) of FIG. 23 are diagrams illustrating a light amount distribution on the light reception element with and without the optical element 16. (a) of FIG. 23 represents the light amount distribution focused on the light reception element when no optical element is provided and is equal to (a) and (b) of FIG. 20. On the other hand, (b) of FIG. 23 represents the light amount distribution focused on the light reception element when the optical element 16 is provided. Each spot of the L11_zero dimensional light beam, the L11_+ or − one dimensional light beam and the L12_zero dimensional light beam is separated into six beams. Therefore, the L12_zero dimensional light beam does not enter into the light reception element and thus the cross talk between layers is avoided. The L11_zero dimensional light beam and the L11_+ or − one dimensional light beam of the signal light are also divided into six. However, this does not have an impact since the light amount received on each element is the same as when the optical element is not inserted.

The objective lens for use in an optical pickup is located on an actuator and movable in the focus direction and the track direction. When the objective lens 9 moves in the track direction, the objective lens 9 is out of position in the track direction with regard to the optical axis of a light beam from the light source as described in FIG. 24 (referred to as optical axis shift). When optical axis shift occurs, a flare light beam interferes as illustrated in FIG. 25. In addition, in terms of the layout of the optical system, the optical element 16 is preferably arranged in the light path commonly shared with the outward path and the return path in some cases.

To avoid this, the optical element 16 is installed on an actuator and moves with the objective lens 9. However, there arises a problem in that the optical element 16 imparts a phase step to the outward light beam advancing from the light source toward the optical recording medium, which degrades the light focus property of the light spot for the optical recording medium 10.

SUMMARY OF THE INVENTION

Because of these reasons, the present inventor recognizes that a need exists for an image pickup including an optical element which reduces an interfering light beam caused by an adjacent layer of an optical recording medium, prevents deterioration of track error signals ascribable to the adjacent layer, particularly corrects the cross talk between layers as a correction device without affecting a light spot focused on the recording layer of the optical recording medium even when the optical axis shift involved with a movable objective lens occurs, and can be installed on an actuator or arranged in the light path portion common in the outward and return light paths, and an optical data processing device using the optical pickup.

Accordingly, an object of the present invention is to provide an image pickup including an optical element which reduces an interfering light beam caused by an adjacent layer of an optical recording medium, prevents deterioration of track error signals ascribable to the adjacent layer, particularly corrects the cross talk between layers as a correction device without affecting a light spot focused on the recording layer of the optical recording medium even when the optical axis shift involved with a movable objective lens occurs, and can be installed on an actuator or arranged in the light path portion common in the outward and return light paths, and an optical data processing device using the optical pickup.

Briefly this object and other objects of the present invention as hereinafter described will become more readily apparent and can be attained, either individually or in combination thereof, by an optical pickup including a light source, a light focus device that focuses an outgoing beam emitted from the light source on a target recording layer of an optical recording medium, a diffraction element provided between the light focus device and the light source that diffracts the outgoing beam emitted from the light source into three light beams, an optical split element provided between the light focus device and the light source that splits a return light beam from the optical recording medium via the light focus device, a ¼ wavelength board provided between the light focus device and the optical split element that imparts an optical phase difference of ¼ wavelength to the outgoing light beam, a light reception device that receives the return light beam split at the optical split element at a receiving position and a correction element provided between the light reception device and the light focus device that reduces an amount of an interfering light beam received on the reception device caused by an adjacent recording layer adjacent to the target recording layer. In the optical pickup, the correction element is divided into multiple areas in a surface vertical to an optical axis. Each area of the multiple areas has a sub-wavelength convexo-concave structure having a pitch equal to or shorter than a wavelength of the outgoing light beam and the sub-wavelength convexo-concave structures of the multiple areas adjacent to each other have groove directions perpendicular to each other. In addition, the filling factors of adjacent areas of the multiple areas are determined to substantially equalize effective refractive indices with regard to the polarization direction of the outgoing beam emitted from the light source and impart a phase difference of $\pi$ with regard to a polarization direction perpendicular to the polarization direction of the outgoing beam emitted from the light source.

As another aspect of the present invention, an optical pickup is provided which includes a first light source that emits a light beam having a wavelength of $\lambda 1$, a second light source that emits a light beam having a wavelength of $\lambda 2$ longer than $\lambda 1$, a light focus device that focuses the light beam emitted from the first light source and the second light source on one of multiple recording layers of an optical recording medium, a diffraction element provided between the light focus device and the first light source that diffracts the outgoing beam emitted from the first light source and the second light source into three light beams, an optical split element provided between the light focus device and the first light source and the second light source that splits a return light beam from the optical recording medium via the light focus device, a ¼ wavelength board provided between the light focus device and the optical split element that imparts an optical phase difference of ¼ wavelength to the outgoing light beam, a light reception device that receives the return light beam split at the optical split element at a receiving position, and a correction element provided between the light reception device and the light focus device that reduces an amount of an interfering light beam received on the reception device caused by adjacent layers to the one of multiple recording layers. In the optical pickup, the correction element is divided into multiple areas in a surface vertical to an optical axis. Each area of the multiple areas has a sub-wavelength convexo-concave structure having a pitch equal to or shorter than $\lambda 1$ and the sub-wavelength convexo-concave structures of the multiple areas adjacent to each other have groove directions perpendicular to each other. In addition, the filling factors of adjacent areas of the multiple areas are determined to substantially equalize effective refractive indices with regard to the polarization direction of the outgoing beam emitted from the light source and impart a phase difference of $\pi$ with regard to a polarization direction perpendicular to the polarization direction of the outgoing beam emitted from the light source.

As another aspect of the present invention, an optical data processing device is provided which includes a spindle motor, a servo control circuit, a system controller and the optical pickup described above.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 6:
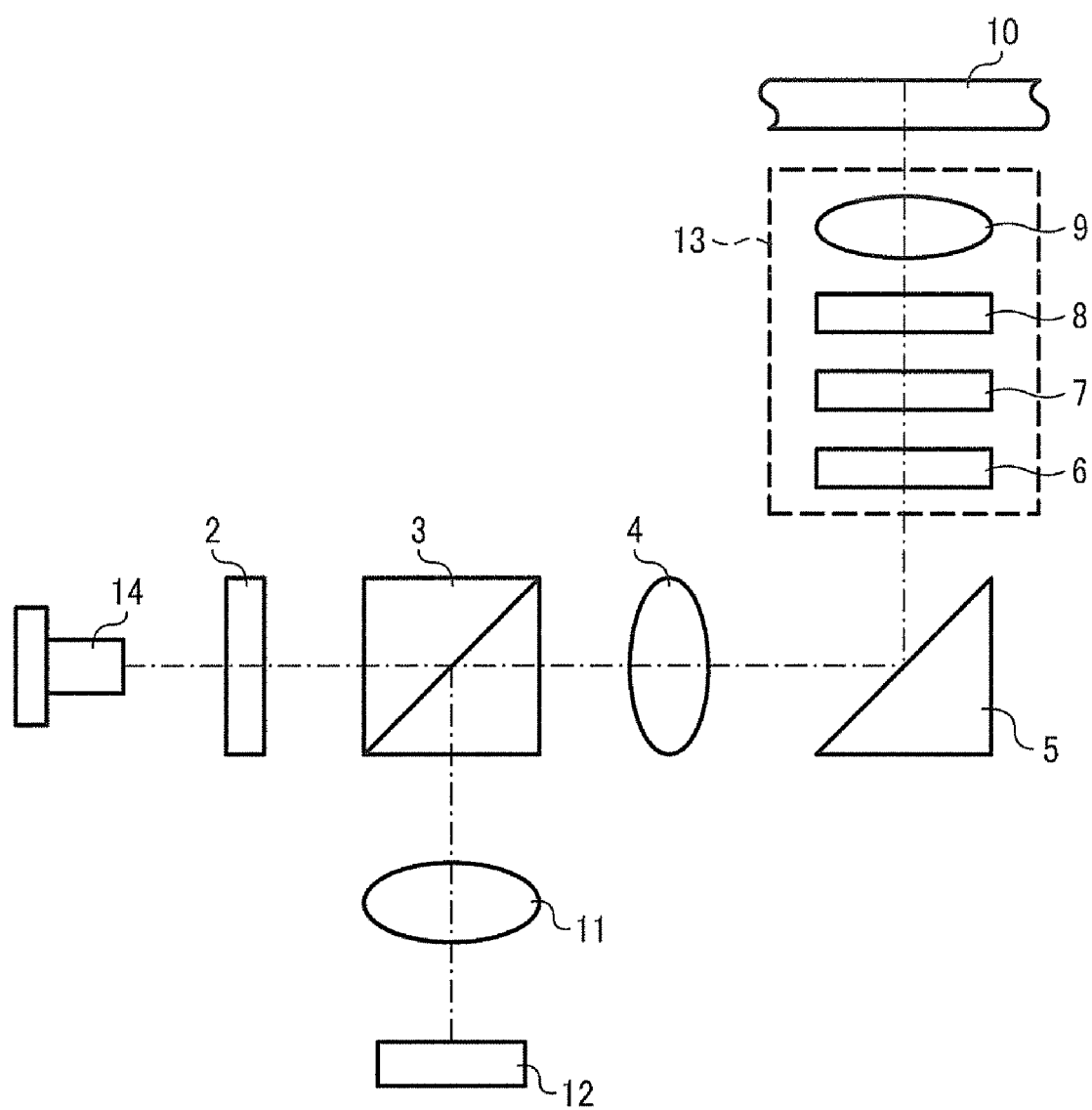
Figure 7:
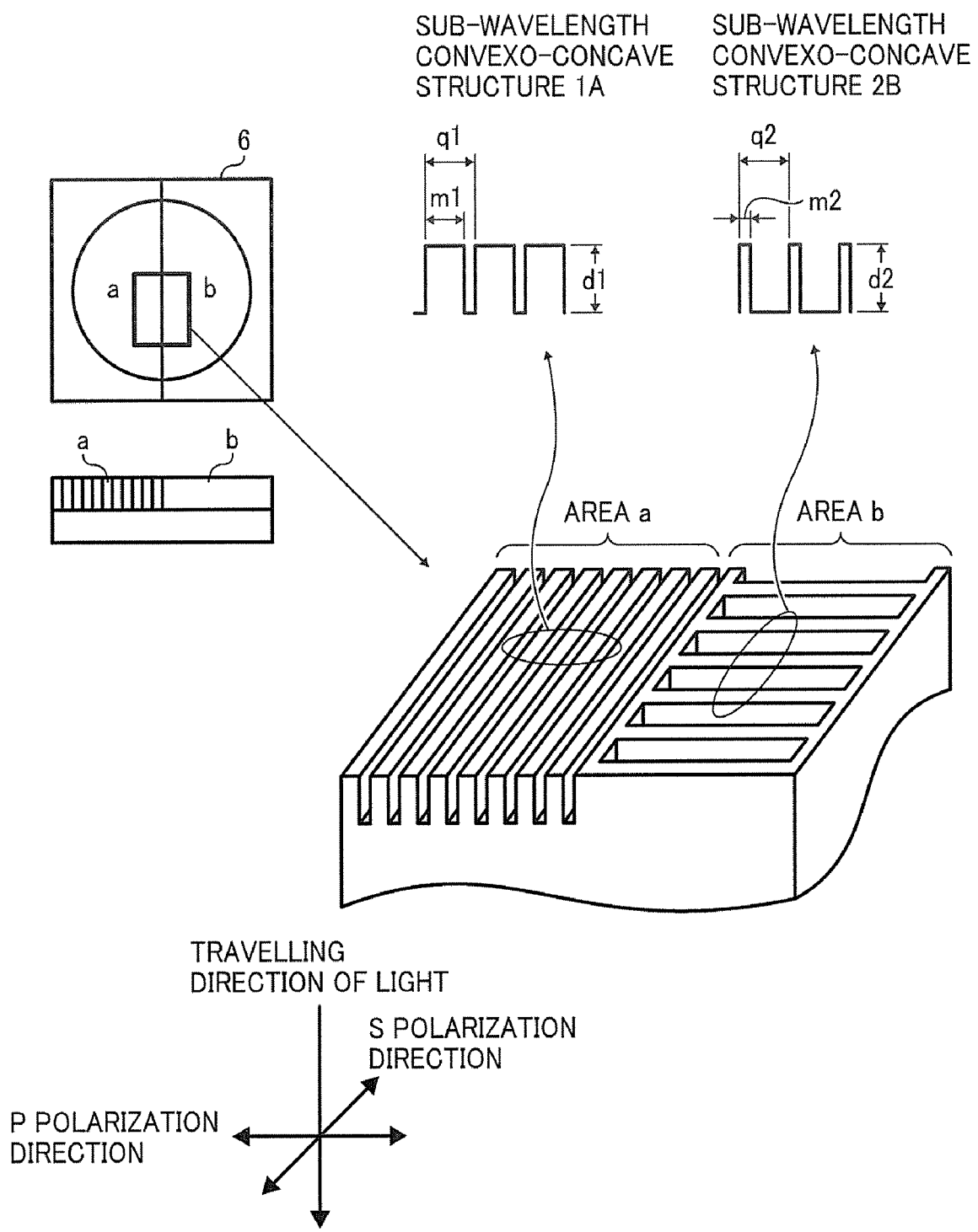
Figure 8:
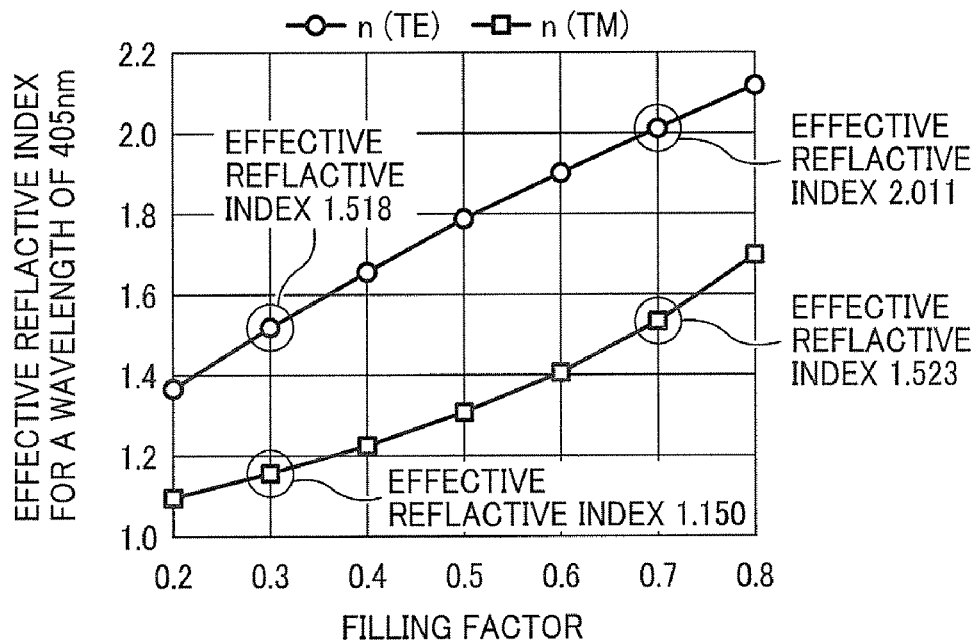
Figure 9:
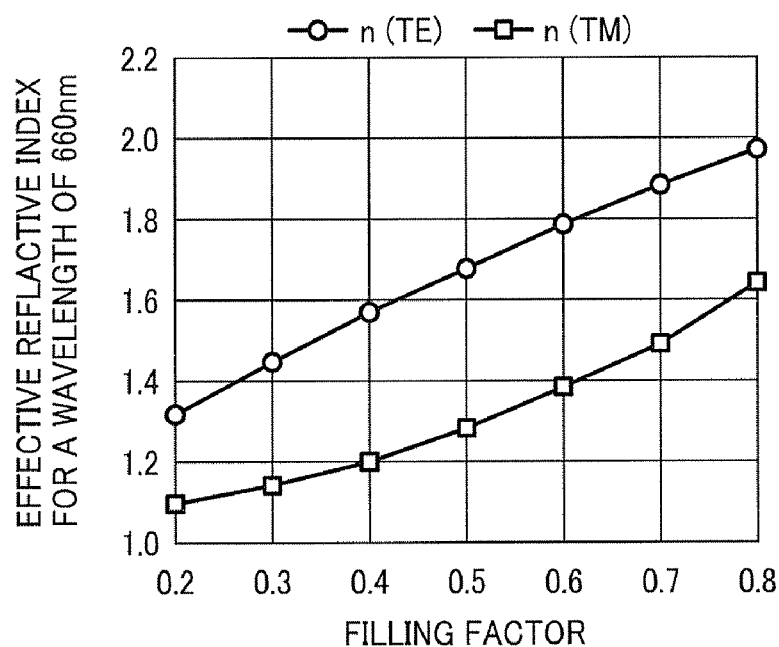
Figure 12:
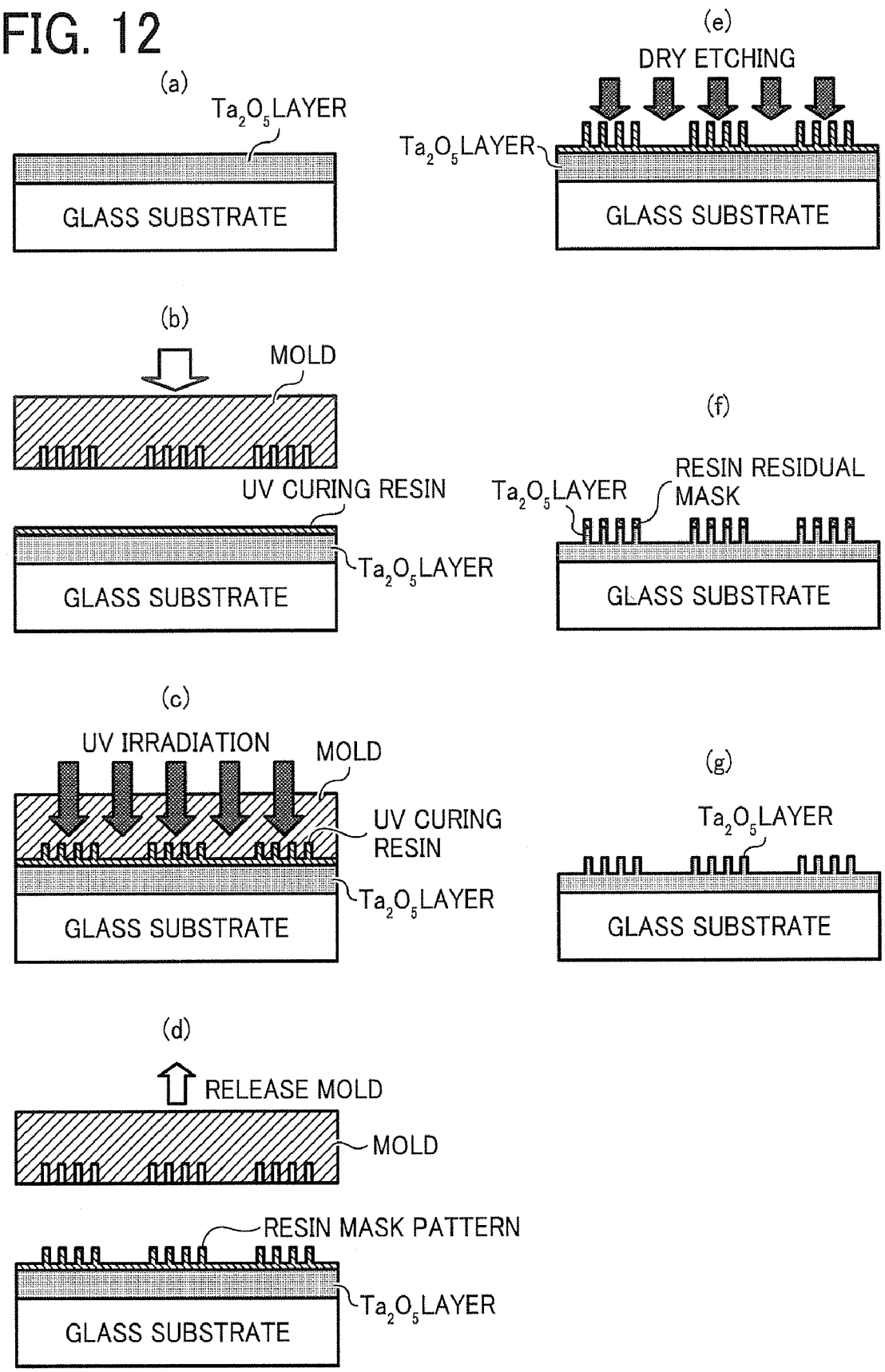
Figure 13:
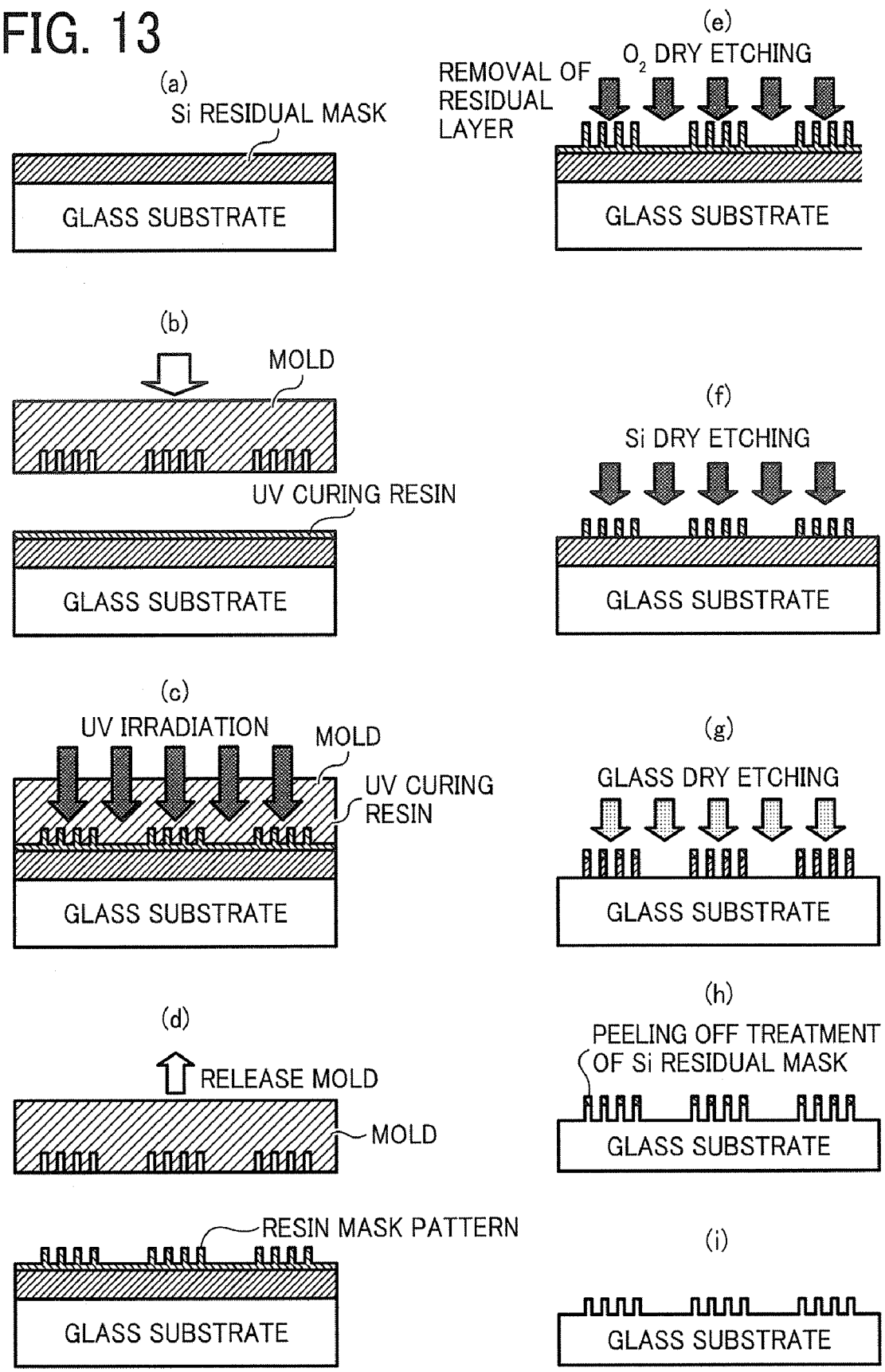
Figure 14:
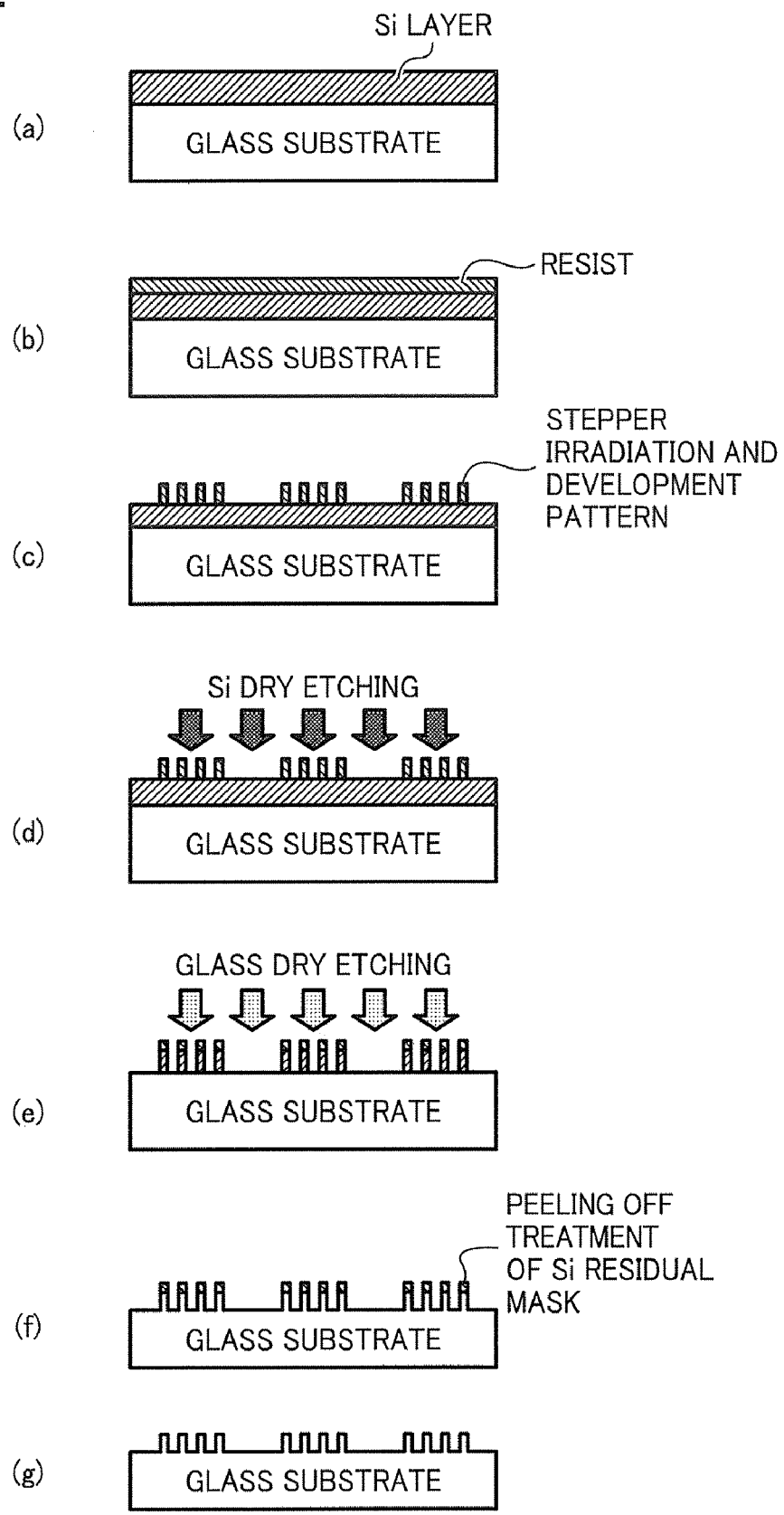
Figure 15:
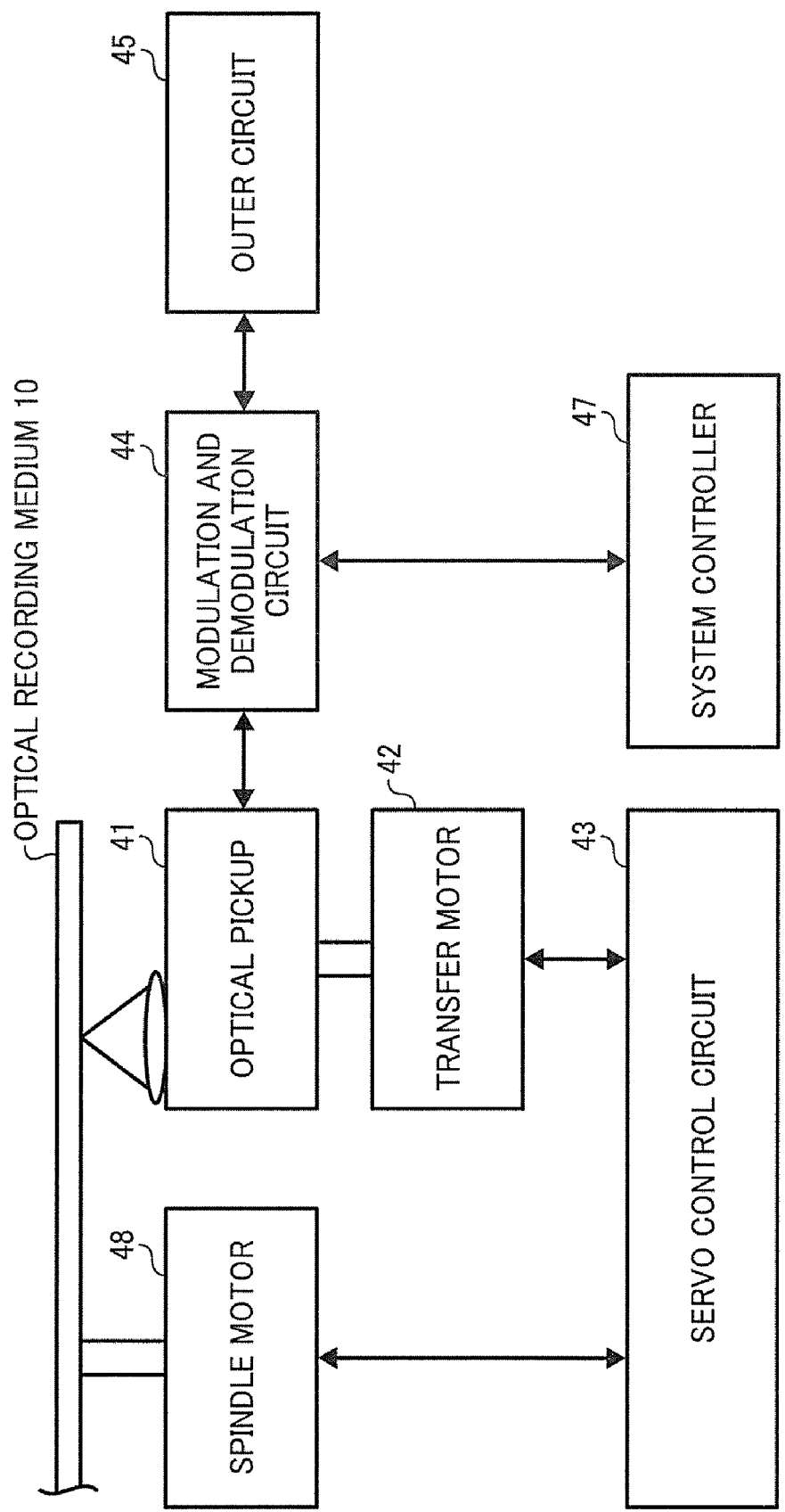
Figure 16:
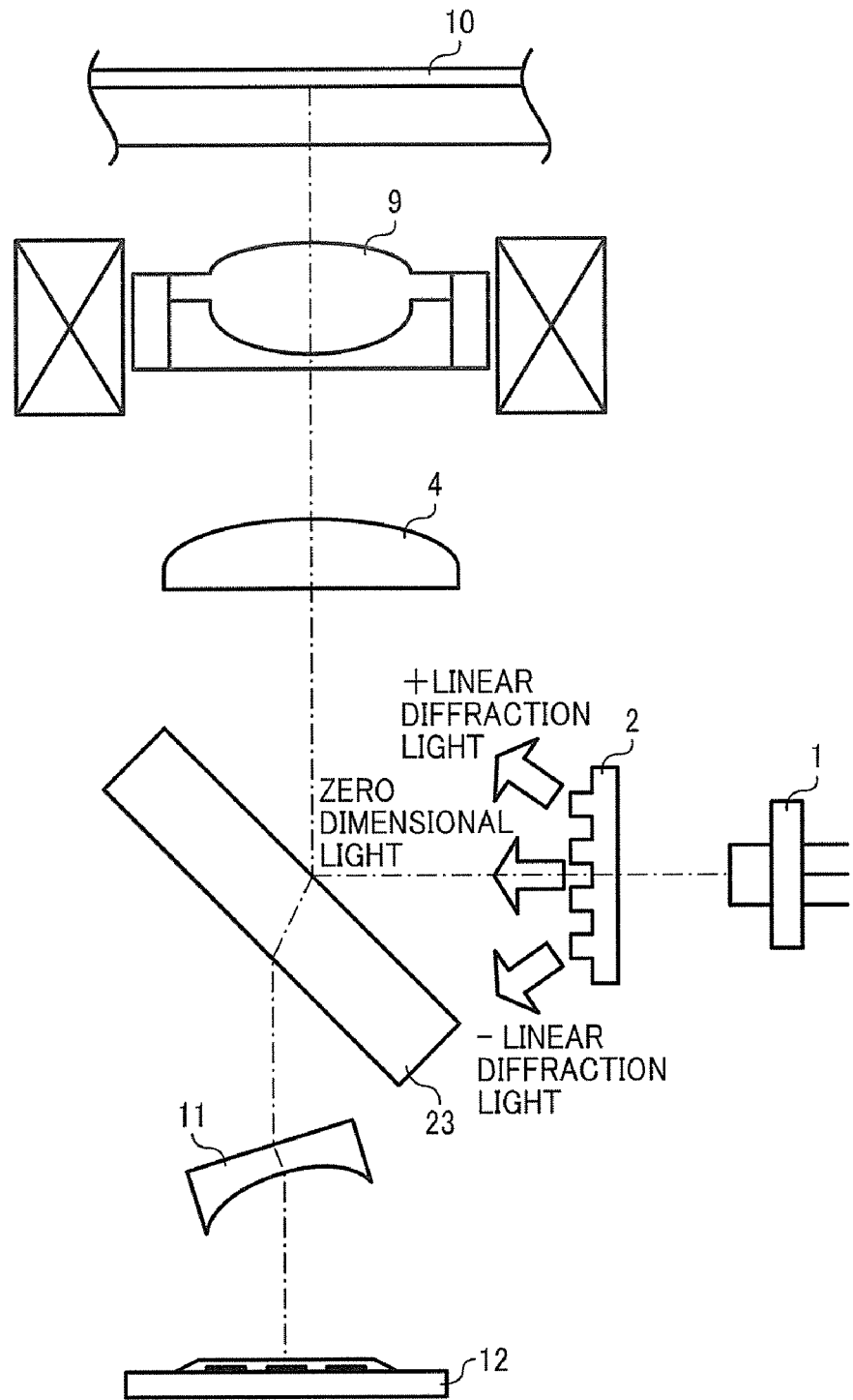
Figure 17:
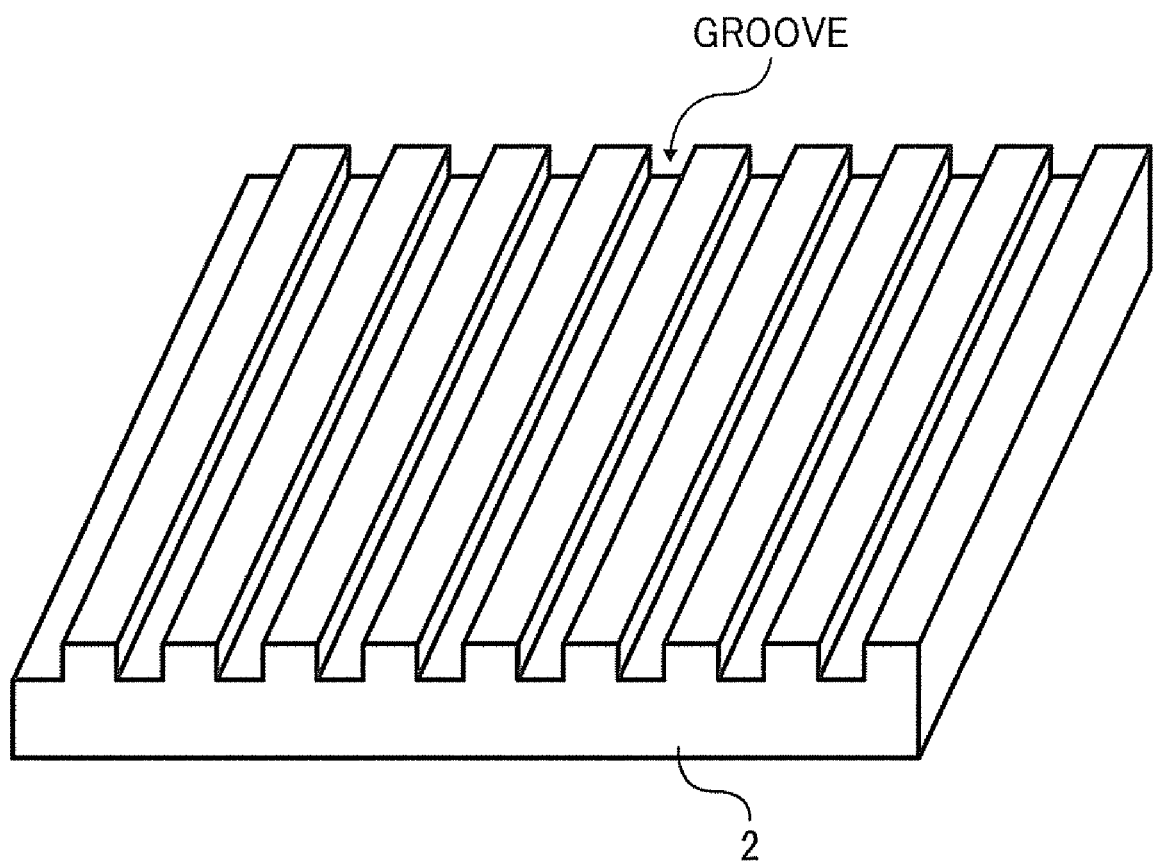
Figure 18:
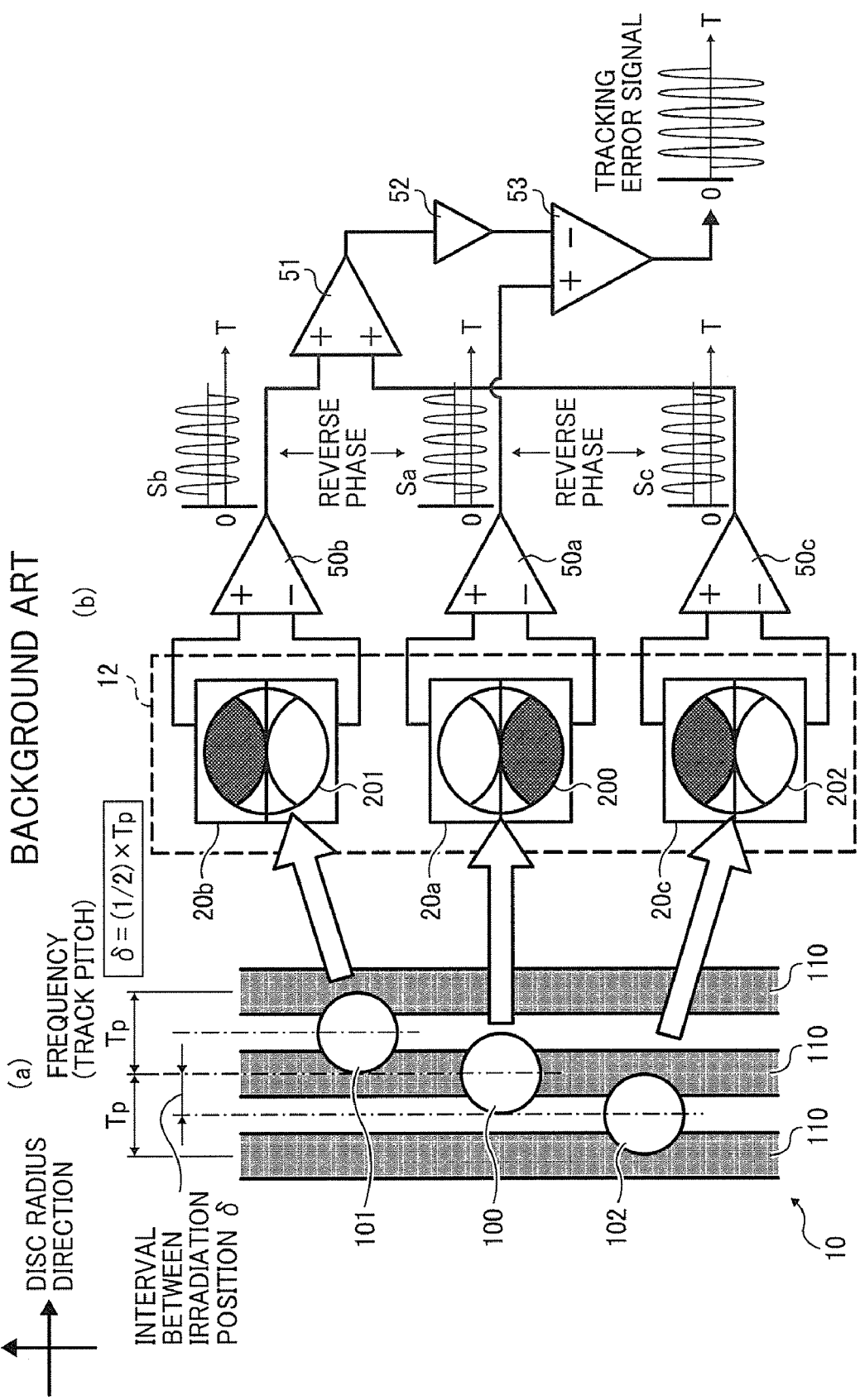
Figure 19:
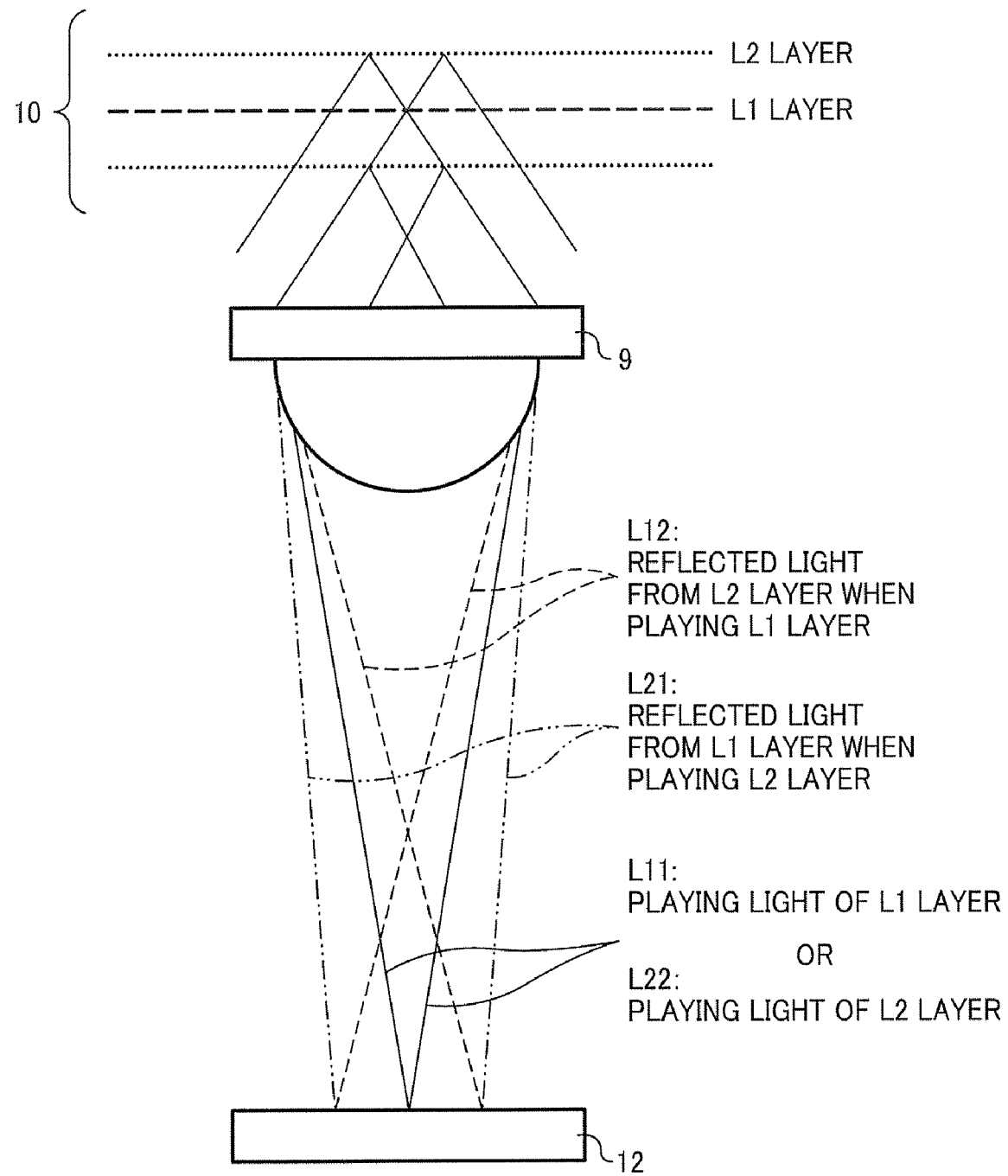
Figure 25:
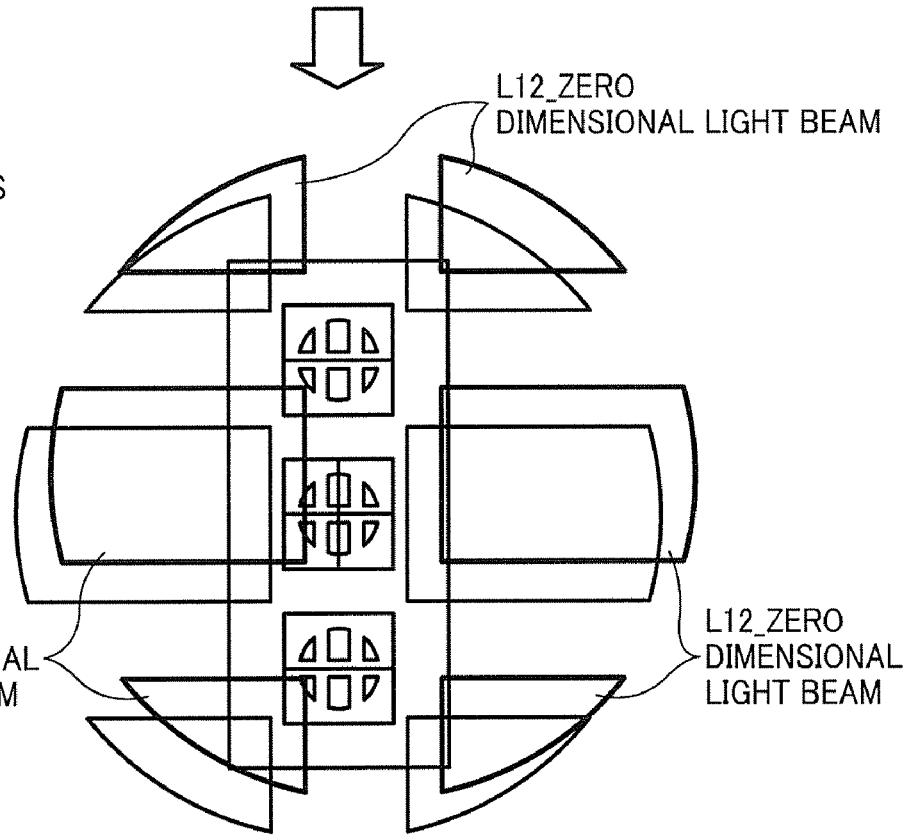

(a) and (b) of FIG. 4 diagrams illustrating correction elements for reducing the cross talk between layers;

(a) and (b) of FIG. 5 are diagrams illustrating light amount distributions focused on the light reception element, (a) of FIG. 5 is a diagram illustrating an L1 layer and (b) of FIG. 5 is a diagram illustrating an L2 layer;

FIG. 6 is a schematic diagram illustrating the optical pickup of Embodiment 2 of the present invention;

FIG. 7 is an enlarged diagram illustrating the correction element for the cross talk between layers;

FIG. 8 is a refractive index (wavelength: 405 nm) for the filling factor by the polarization direction;

FIG. 9 is a refractive index (wavelength: 660 nm) for the filling factor by the polarization direction;

(a) to (d) of FIG. 10 are process drawings illustrating a method of manufacturing a mold formed of quartz as basal material;

(a) to (d) of FIG. 11 are process drawings illustrating a method of manufacturing a mold formed of silicon as basal material;

(a) to (g) of FIG. 12 are process drawings illustrating a procedure of filming $Ta_2O_5$ on a glass substrate and forming a correction element on the $Ta_2O_5$ film;

(a) to (i) of FIG. 13 are process drawings illustrating a procedure of forming a diffraction element on the glass substrate using a silicon film and a mold;

(a) to (g) of FIG. 14 are process drawings illustrating procedures of forming a $Ta_2O_5$ film on a glass substrate and forming a diffraction element on the $Ta_2O_5$ film;

FIG. 15 is a block chart illustrating an optical data processing device of Example 3 described later of the present invention;

FIG. 16 is a schematic diagram illustrating the structure of an optical pickup employing a typical DPP system;

FIG. 17 is a diagram illustrating an example of the structure of a correction element;

FIG. 18 is a diagram illustrating light focus spots on an optical recording medium;

FIG. 19 is a pattern diagram illustrating the light path of a double layer optical recording medium when playing data signals thereon;

FIG. 20 are diagrams illustrating light amount distributions focused on the light reception element, (a) of FIG. 5 is a diagram illustrating an L1 layer and (b) of FIG. 5 is a diagram illustrating an L2 layer;

FIG. 21 is a structure diagram illustrating an optical system having an optical element for reducing the amount of interfering light beams ascribable to the adjacent layer received on the light reception element;

(a) of FIG. 22 is a front view of the correction element for reducing the cross talk between layers and (b) of FIG. 22 is a cross section thereof;

(a) of FIG. 23 is a diagram illustrating the light amount distribution without an optical element and (b) of FIG. 23 is a diagram illustrating the light amount distribution with an optical element;

FIG. 24 is a structure diagram illustrating an optical system having an optical element for reducing the amount of the interfering light ascribable to the adjacent layer received on the light reception element with the optical axis on and off; and FIG. 25 is a diagram illustrating the light amount distribution on the light reception element with the optical axis on and off.

DETAILED DESCRIPTION OF THE INVENTION

The present invention will be described below in detail with reference to several embodiments and accompanying drawings.

Embodiment 1

Figure 1:
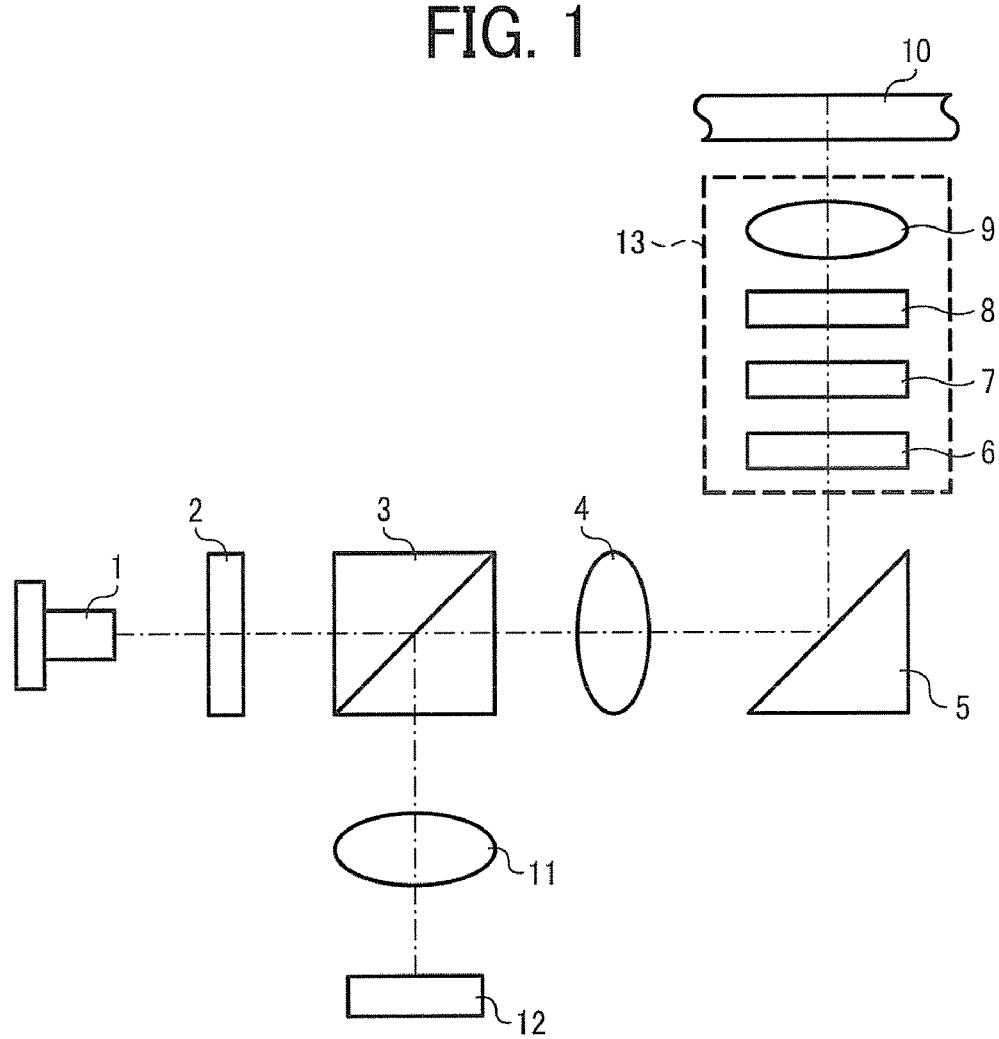
FIG. 1 is a schematic diagram illustrating the optical pickup of Embodiment described later of the present invention.

FIG. 1 is a schematic diagram illustrating the pickup of Embodiment 1 of the present invention. In FIG. 1, a numeral reference 1 represents a semiconductor 1, a numeral reference 2 represents a diffraction element for 3 beams, a numeral reference 3 represents a polarization beam splitter, a numeral reference 4 represents a collimate lens, a numeral reference 5 represents a polarization mirror, a numeral reference 6 represent a correction element to reduce cross-talk, a numeral reference 7 represents a crystal liquid element to correct spherical aberration, a numeral reference 8 represents a ¼ wavelength board, a numeral reference 9 represents an objective lens, a numeral reference 10 represents an optical recording medium, a numeral reference 11 represent a detection lens, a numeral reference 12 represents a light reception element, and a numeral reference 13 represent an actuator. The optical recording medium 10 has data recording layers L1 and L2 from the objective lens 9 side. The collimate lens 4 and the detection lens 11 are optional.

A semiconductor 1 emits a light beam having a wavelength of, for example, 405 nm, in a predetermined wavelength range, for example, the blue wavelength band (395 to 415 nm) which satisfies the specification of the Blu-ray (hereinafter referred to as BD) optical recording media}.

A diffraction element 2 for 3 beams splits the light beam emitted from the semiconductor laser 1 into a zero dimensional light (main light) beam and + and − one dimensional light (sub-light) beams to detect track error signals according to the 3 beam method or the DPP method. Therefore, play signals are obtained by the detected signal of the zero dimensional light (main light) and track error signals are obtained by calculation of the detected signals of zero dimensional light beam and + or − one dimensional light (sub-light) beam reflected at the optical recording medium 10.

The polarization beam splitter 3 is a light path converter to guide an outgoing light beam emitted from the semiconductor laser 1 to the objective lens 9 which focuses the outgoing light beam on the optical recording medium 10 as the light spot and a returned light beam reflected at the optical recording medium 10 to the light reception element 12. The polarization beam splitter 3 functions as a light path converter depending on the polarization by which the path of an incident light beam is converted depending on the polarization to satisfy the demand of high efficiency at the optical system. The collimate lens 4 converts a diversion incident light beam emitted from the semiconductor laser 1 into a parallel light beam and also functions as a light focus lens for a returned light beam reflected at the optical recoding medium 10 toward the light reception element 12.

The polarization mirror 5 is a mirror to which a reflection layer is deposited and converts the light path by 90 degrees.

The correction element 6 for reducing the cross talk is an optical member which divides an interfering light beam reflected at an adjacent layer into at least two when recording and/or playing data signals on a double layer optical recording medium to reduce the amount of the interfering light beam received on the light reception element 12.

The liquid crystal 7 is a correction element which creates the phase difference to correct spherical aberration due to the difference in the thickness of the optical recording medium 10.

The ¼ wavelength board 8 is provided between the polarization splitter 3 and the objective lens 9 to satisfy a high efficiency demand for an optical recording system and used as a device to change the polarization of an incident light beam.

The objective lens 9 is desirable to have a high numeric aperture satisfying the BD specification, i.e., about 0.85.

The optical recording medium 10 is, for example, a BD optical recording medium and a double layer optical recording medium having data recording layers L1 and L2 in this order from the objective lens side.

The detection lens 11 is an astigmatic lens which creates astigmatism to detect focus error signals by an astigmatic method.

The light reception element 12 detects data signals and/or error signals by receiving a light beam reflected by the optical recording medium 10.

The actuator 13 has a movable portion including the correction element 6 for reducing the cross talk, the liquid crystal element 7 for correcting the spherical aberration, and the objective lens 9 and moves along the focus direction and the track direction (radial direction) of the optical recording medium 10.

The diversion light beam emitted from the semiconductor laser 1 is diffracted by the diffraction element 2 into 3 beams. The 3 beams transit the polarization beam splitter 3 and are collimated into parallel light beams by the collimate lens 4, reflected by the polarization mirror to change the light path by 90 degrees and focused on the objective lens 9 by way of the correction element 6, the liquid crystal and the ¼ wavelength board 8 to form a light spot on a predetermined recording layer of the optical recording medium 10. The returned light beam from the optical recording medium 10 tracks back the light path of the outgoing light beam and is reflected at the polarization beam splitter 3 and focused on the light reception element 12 by way of the detection lens 11.

When the polarization beam splitter 3 and the ¼ wavelength board 8 are provided, a linear polarization, for example, a light beam having P polarization, which enters into the polarization beam splitter 3 from the semi-conductor laser 1 side, transits the mirror face of the polarization beam splitter 3 by way of the ¼ wavelength board 8, is changed into a light beam having a circular polarization and advances into the optical recording medium 10 side. The light beam having a circular polarization is reflected at the optical recording medium 10 and becomes a light beam having a circular polarization in the reversed way. Then, the light beam having a circular polarization is changed to another light beam having a linear polarization, for example, S polarization, while passing through the ¼ wavelength board again. This another light beam having a linear polarization is reflected at the mirror face of the polarization beam splitter 3 and advances to the light reception element 12 side.

As another example, a beam splitter which transmits or reflects a light beam with a predetermined ratio, or a hologram element which transmits a light beam emitted from the semiconductor laser 1 and diffracts a light beam reflected at the optical recording medium 10 into + one dimension or − one dimension can be also used instead of the polarization beam splitter 3.

The liquid crystal 7 corrects spherical aberration caused by the difference in thickness when recording and/or playing data signals on the target recording layer of the optical recording medium 10 having a thickness from the light beam entrance phase to the target recording layer out of the design specification of the objective lens 9.

Since a liquid crystal has a polarization property, the liquid crystal 7 selectively creates a phase difference by the polarization of an incident light beam and the power source driving. That is, when the liquid crystal 7 is powered on, the liquid crystal 7 creates a phase difference to, for example, a light beam having P polarization traveling from the side of the semiconductor 1 to the side of the optical recording medium 10, by changing the wave front to correct spherical aberration cause by the difference in thickness. When the liquid crystal element 7 is powered off, the liquid crystal element 7 transmits an incident light beam without creating a phase difference, i.e., changing the wave front, irrespective of the polarization of the incident light beam.

Figure 2:
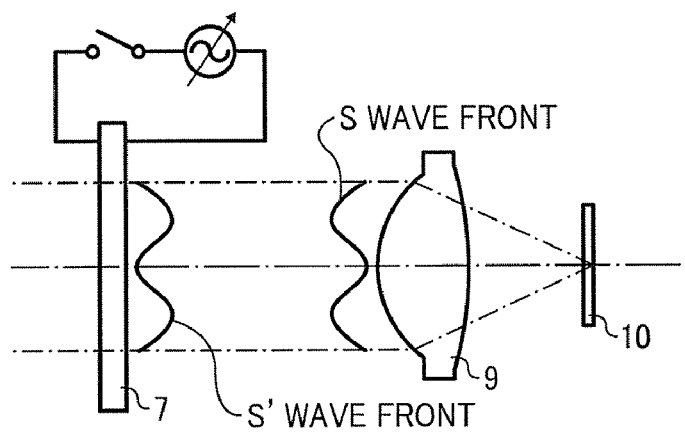
FIG. 2 is a diagram illustrating the correction principle of the spherical aberration by liquid crystal.

FIG. 2 is a diagram illustrating the correction principle of the spherical aberration by liquid crystal. S represents a phase (i.e., wave front) of the spherical aberration occurring to a light beam focused on the recording layer of the optical recording medium 10 by the objective lens 9 which is caused by the thickness difference between the optical recording medium 10 and the design value. S' is a phase (i.e., wave front) created by the liquid crystal 7 to correct the spherical aberration caused by the thickness difference.

As illustrated in FIG. 2, the thickness difference in the optical recording medium 10 causes the spherical aberration. The spherical aberration is corrected by forming and driving the liquid crystal element 7 to cause a light beam which has passed through the liquid crystal element 7 to have a phase distribution reverse to the phase distribution of the spherical aberration and enter into the objective lens 9.

In addition, when a light beam emitted from the semiconductor laser 1 is split into 3 beams by the diffraction element 2 as illustrated in FIG. 1, the light reception element 12 includes a main light reception element 20a {the light reception portion of (b) of FIG. 18} and first and second sub light reception elements 20b and 20c {the light reception portion of (b) of FIG. 18} situated on both sides of the main light reception element 20a to receive the first and the second sub-light beams reflected at the optical recording medium 10.

Figure 3:
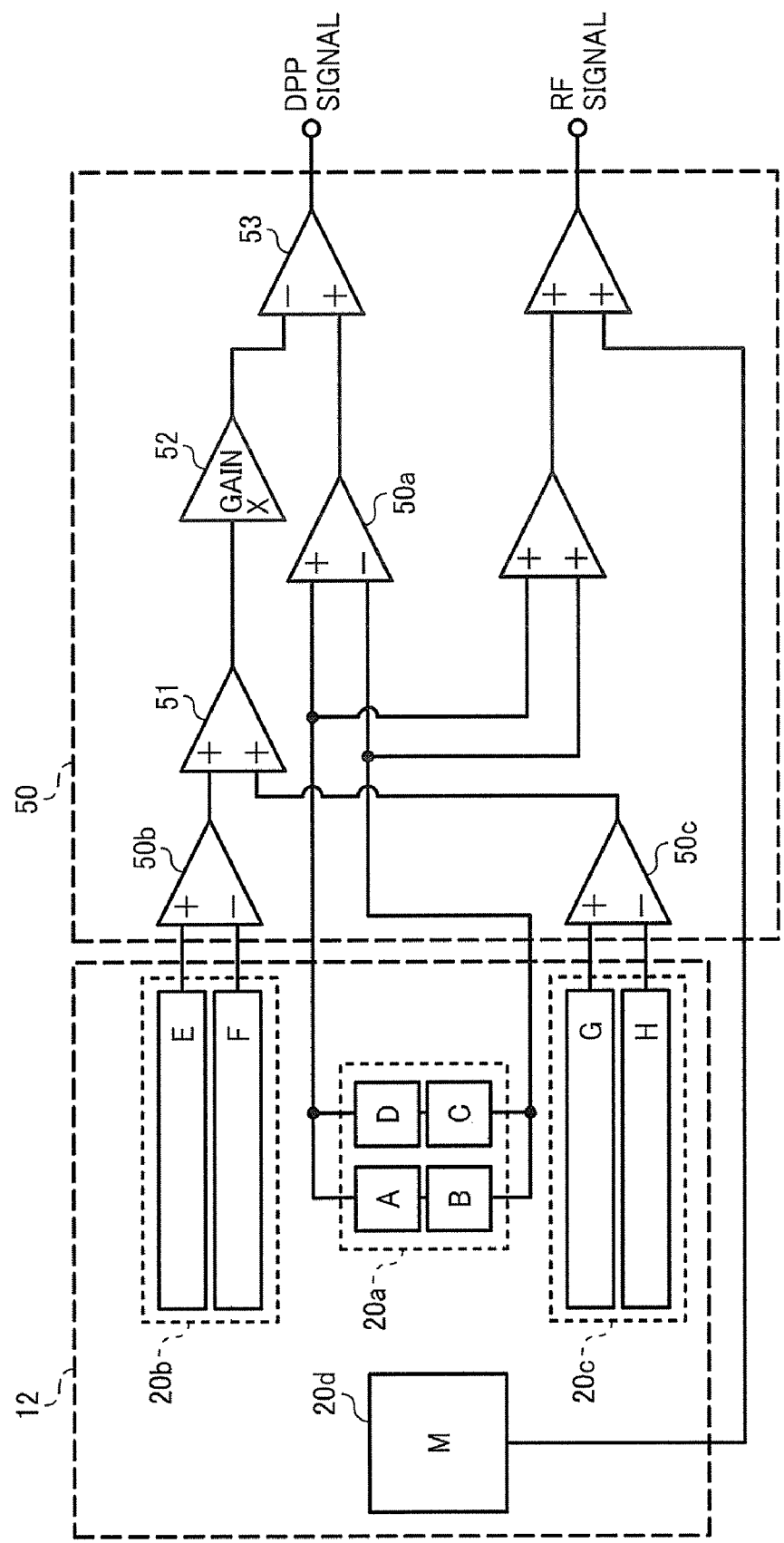
FIG. 3 is a diagram illustrating a signal detection circuit of DPP system.

FIG. 3 is a diagram illustrating an example of the light reception element 12 for use in the optical light pickup of Embodiment 1 and a calculation circuit 50 for signal calculation. With reference to FIG. 3, the main light beam received at the main light reception element (light reception portion 20a) is a zero dimensional diffraction light beam which has passed through the diffraction element 2 in a straightforward manner and the first and the second sub-light beams received at the first and the second sub-light reception element (light reception portions 20b and 20c) are light beams which has diffracted to + and − one dimensional light beams by the diffraction element 2.

The main light reception portion (light reception potion 20a) detects focus error signals and/or track error signals and, for example, preferably, is independently divided into two in the radial direction (referred to as R direction) dealing with the radial direction of the optical recording medium 10 and in the tangential direction (referred to as T direction) dealing with the rotation direction of the recording medium 10. That is, the main light reception element (light reception portion 20a) has a structure having at least 4 divisions.

The first and the second sub-light reception elements (light reception portions 20b and 20c) are divided into two in the R direction to detect the track error signals by the DPP system.

That is, the main light reception element (light reception portion 20a) is preferably divided into at least two in the R direction and at least two in the T direction and the first and the second sub-light reception elements (light reception portions 20b and 20c) are preferably divided into at least two in the R direction to detect track error signals by the DPP system.

As described above, when the main light reception element is divided into four or eight and the first and the second sub-light reception elements are divided into two in the R direction, track error signals are detectable by the DPP system.

When the four divided areas of the main light reception element 20a has four light reception areas A, B, C and D, the first sub-light reception element 20b has two light reception areas E and F, the second sub-light reception element 20c has light reception areas G and H, and an assistant light reception element 20d has a light reception area M, the division structure of the light reception element 12 as illustrated in FIG. 3 and a focus error signal FES, a track error signal TES and a data playing signal RF-SUM obtained by the optical structure of the optical pickup according to Embodiment 1 illustrated in FIG. 1 are, for example, as illustrated in Table 1. For description convenience, each light reception area and the signals detected thereby are represented by the same symbols.

TABLE 1

| FES | Astigmatic method: (B + D) − (A + C) |
|---|---|
| TES | Push-Pull: (B + C) − (A + D) |
| | DPP: {(B + C) − (A + D)} − κ {(E − F) + (G − H)} |
| RF-SUM | A + B + C + |

κ represents gain and a predetermined constant number.

On the other hand, as described above with reference to FIG. 20, when recording and/or playing data signals on a double layer optical recording medium, a return light beam to the light reception element 12 includes not only a light beam reflected at the target recording and/or playing layer positioned at the focus of the objective lens 9 but also an interfering light beam created at the adjacent layer to the target layer. The light beam from the adjacent layer which is overlapped with the one dimensional and + or − dimensional light reflected at the target recording and/or playing layer is a zero dimensional light. This phenomenon is referred to as cross talk between layers.

The correction element 6 for reducing the cross talk between layers of Embodiment 1 illustrated in FIG. 1 has a phase step to diffract a returned light beam when recording and/or playing data signals on the recording layer and/or the playing layer of the optical recording medium 10 and prevent the light reception element 12 from receiving an interfering light reflected at the adjacent layer. When at least the zero dimensional light by the adjacent layer which is overlapped with the + or − one dimensional light reflected at the target layer is diffracted by this phase step, the interfering light beam reflected by the adjacent layer is reduced and thus light reception of the interfering light beam at the first and the second sub-light reception elements 20b and 20c is avoidable.

When a light beam emitted from the semiconductor laser 1 which travels to the side of the object lens 9 is S polarization, the correction element 6 for reducing cross talk between layers is preferably designed to transmit the light beam having S polarization traveling to the side of the objective lens 9 in a straightforward manner and diffracts only a light beam which is changed from S polarization to P polarization while reflected at the optical recording medium 10 via the ¼ wavelength board 8. The reason why the correction element 6 for reducing cross talk between layers is selective with regard to polarization is to prevent reduction of the amount of recording light and/or deterioration of play signals caused by reduction of the intensity of the light focus spot due to loss of a light beam traveling to the side of the optical recording medium 10 because of diffraction.

(a) and (b) of FIG. 4 are embodiments of a method of providing a phase step (area division method) of the correction element for reducing cross talk between layers. The area division method has a wide variety and is not limited to this Embodiment. In (a) of FIG. 4, the correction element is divided into two at almost center of the light entrance area. Also as illustrated in (b) of FIG. 4, the correction element can be divided into 6 as described in the technology described above.

The zero dimensional light beam reflected by the target layer and the zero dimensional light beam reflected by the adjacent layer are significantly different with regard to the amount of light. Therefore, the zero dimensional light beam reflected by the adjacent layer does not have a significant impact on the differential signal {i.e., (B+C)−(A+D) signal described in Table 1} used to detect a track error signal by the DPP system.

However, the + or − one dimensional light beam reflected at the target layer and the zero dimensional light beam reflected at the adjacent layer are not relatively different with regard to the amount of light. Therefore, as described above, with reference to FIG. 20, the zero dimensional light beam reflected by the adjacent layer has a significant impact on the signal {i.e., (E−F)+(G−H) signal shown in Table 1} used to detect a track error signal by the DPP system.

Therefore, preventing the first and the second sub-light reception elements 20b and 20c from receiving a light beam in which the zero dimensional light beam reflected at the adjacent layer is overlapped with the + or − one dimensional light beam reflected at the target layer is necessary to reduce swing of the track error signal.

The structure illustrated in FIG. 4B is a structure to cause the zero dimensional light beam reflected at the adjacent layer to be away from the first and the second sub-light reception elements 20b and 20c as described later.

The optical pickup of Embodiment 1 is assumingly applied to the optical recording medium 10 as illustrated in FIG. 19. As described above with reference to FIG. 19, a light beam L12 reflected at the layer L2 has a focus positioned ahead of that of the light beam L11 received at the light reception element 12 when playing data signals on the layer L1 closer to the light incident face. By contrast, a light beam L21 reflected at the layer L1 has a focus positioned behind that of the light beam L11 received at the light reception element 12 when playing data signals on the layer L2.

The light amount distributions of a returned light reflected at the optical recording medium 10 and focused on the light reception element 12 via the correction element 6 for reducing cross talk between layers for the area pattern illustrated in (a) of FIG. 4 are as illustrated in (a) and (b) of FIG. 5. (a) of FIG. 5 is a diagram illustrating the light amount distribution focused on the light reception element 12 when recording data signals on the L1 layer. (b) of FIG. 5 is a diagram illustrating the light amount distribution focused on the light reception element 12 when recording data signals on the L2 layer.

In (a) of FIG. 5, L11_zero dimensional light beam, L11_+ or − one dimensional light beam, L12 zero dimensional light beam represent a zero dimensional light beam reflected at the L1 layer, + or − one dimensional light reflected at the L1 layer, and a zero dimensional light beam reflected at the L2 layer, respectively, when playing data signals on the L1 layer as in the case illustrated in (a) of FIG. 20. In addition, L12_zero dimensional light beam represents a light beam diffracted at the phase step of the correction element 6 for reducing cross talk between layers.

In (b) of FIG. 5, L22_zero dimensional light beam, L22_+ or − one dimensional light beam, L21_zero dimensional light beam represent a zero dimensional light beam reflected at the L2 layer, + or − one dimensional light reflected at the L2 layer, and a zero dimensional light beam reflected at the L1 layer, respectively, when playing data signals on the L2 layer as in the case illustrated in (a) of FIG. 20. In addition, L21_zero dimensional light beam represents a light beam diffracted at the phase step of the correction element 6 for reducing cross talk between layers.

As illustrated in (a) and (b) of FIG. 5, the optical pickup of Embodiment 1 of the present invention prevents the first and the second sub light reception elements 20b and 20c from receiving a light beam in which the zero dimensional light beam reflected at the adjacent layer is overlapped with the + or − one dimensional light beam reflected at the target layer.

Therefore, the interfering light beam ascribable to the adjacent layer in the light reception area of the + or − one dimensional light beam for DPP signals so that swing of the track error signals due to the interfering light beam caused by the adjacent layer can be significantly reduced.

In particular, since the correction element 6 of Embodiment 1 of the present invention can be arranged in the light path shared between the outgoing light path and the return light path and installed on the actuator 13, the cross talk between layers can be reduced without affecting a light spot focused on the recording layer of the optical recording medium 10 even when the optical axis shift involved with mobility of the objective lens occurs.

Embodiment 2

FIG. 6 is a schematic diagram illustrating the optical pickup of Embodiment 2 of the present invention. The difference between the structure of Embodiment 1 and that of Embodiment 2 is that while the optical pickup of Embodiment 1 is exclusive for one optical recording medium (e.g., BD optical recording media), the optical pickup of Embodiment 2 deals with reading and writing data signals on two different kinds of optical recording media, e.g., BD optical recording media and DVD recording media.

A semiconductor 14 is arranged in Embodiment 2 instead of the semiconductor lased 1 of FIG. 1. Furthermore, each optical element deals with two wavelengths. The semiconductor laser 14 is a two wavelength light source unit which accommodates a light source for BD formed of a laser diode which emits a light beam in the wavelength band of 405 nm and a light source for DVD formed of a laser diode which emits a light beam in the wavelength band of 660 nm. The two wavelength light source can be typified into a monolithic type in which two light sources are formed on the same semiconductor substrate and a hybrid type in which individual chips are assembled. In addition, in Embodiment 2, the polarization direction of a light beam emitted from the light source for BD media and the polarization direction of a light beam emitted from the light source for DVD media are significantly the same.

The diffraction element 2 for 3 beams splits the light beam emitted from the semiconductor laser 14 into a zero dimensional light (main light) beam and + and − one dimensional light (sub-light) beams to detect track error signals according to the 3 beam method or the DPP method. Therefore, play signals are obtained by the detected signal of the zero dimensional light (main light) and track error signals are obtained by calculation of the detected signals of zero dimensional light beam and + or − one dimensional light (sub-light) beam reflected at the optical recording medium 10. In Embodiment 2, the diffraction element 2 is formed of diffraction gratings on both sides thereof. That is, one diffraction grating for 3 beams is on one side for BD media and, the other, for DVD. This is because, since the BD optical recording media and the DVD optical recording media have guide grooves formed on the recording layer having different track pitches, different diffraction gratings are required to deal with the different track pitches for both media.

The polarization beam splitter 3 is a light path converter to guide an outgoing light beam emitted from the semiconductor laser 14 to the objective lens 9 which focuses the outgoing light beam on the optical recording medium 10 as the light spot and a returned light beam reflected at the optical recording medium 10 to the light reception element 12. To be more specific, the polarization beam splitter 3 is a light path converter depending on the polarization by which the path of an incident light beam is converted depending on the polarization to satisfy the demand of high efficiency at the optical system.

The collimate lens 4 collimates a diversion incident light beam emitted from the semiconductor laser 1 into a parallel light beam and also functions as a light focus lens for a returned light reflected at the optical recoding medium 10 toward the light reception element 12.

The polarization mirror 5 is a mirror to which a reflection layer is deposited and converts the light path by 90 degrees.

The correction element 6 for reducing the cross talk is an optical member which divides an interfering light beam reflected at an adjacent into at least two when recording and/or playing data signals on a double layer optical recording medium to reduce the amount of the interfering light beam received on the light reception element 12.

The liquid crystal 7 is a correction element which creates the phase difference to correct spherical aberration due to the thickness difference in the optical recording medium 10 and adjust the addition phase difference depending on each optical recording medium.

The ¼ wavelength board 8 is provided between the polarization splitter 3 and the objective lens 9 to satisfy the demand for a high efficiency for an optical recording system and used as a device to change the polarization of an incident light beam.

The objective lens 9 is a plastic diffraction lens which focuses a light beam on, for example, a BD optical recording medium and a DVD optical recording medium. A diffraction structure is formed on the surface of the objective lens 9, which is switchable with regard to the focus position and the numeric aperture according to the wavelength of an incident light beam. The objective lens 9 has a numeric aperture NA of 0.85 for an incident light beam having a wavelength of 405 nm and focuses the light beam on a BD optical recording medium and a numeric aperture NA of 0.65 for an incident light beam having a wavelength of 660 nm and focuses the light beam on a DVD optical recording medium.

The optical recording medium 10 is a BD optical recording medium and a DVD optical recording medium and each thereof is a double layer optical recording medium having data recording layers L1 and L2 in this order from the objective lens side. The BD optical recording medium has data recording layers on the position at 0.075 mm and 0.100 mm from the incident light beam side. The DVD optical recording medium has data recording layers on the position at 0.600 mm and 0.640 mm from the incident light beam side.

The detection lens 11 is an astigmatic lens which creates astigmatism to detect focus error signals by an astigmatic method.

The light reception element 12 detects data signals and/or error signals by receiving a light beam reflected from the optical recording medium 10.

The actuator 13 is a movable portion including the correction element 6 for reducing the cross talk, the liquid crystal element 7 for correcting the spherical aberration, and the objective lens 9, and moves along the focus direction and the track direction (radial direction) of the optical recording medium 10.

In Embodiment 2, the correction element 6 for reducing cross talk between layers transits a light beam having a wavelength of 405 nm or 660 nm and can add a phase difference for a returned light as in the case of Example 1. The design for creating a phase difference is adjusted to the optical recording medium having a severer cross talk than the other. That is, the design is adjusted to the optical recording medium having a smaller difference between the amount of the signal light beam of the sub spots and the amount of the interfering light beam from the adjacent layer.

By this structure, the optical pickup of Embodiment 2 can be applied to a BD/DVD convertible type. Deterioration of detection of track error signals ascribable to the adjacent layer (thickness variance between the gap between layers) in an optical recording medium is prevented by reducing the interfering light beam from the adjacent layer. Especially, the cross talk between layers can be reduced without affecting a light spot focused on the recording layer of the optical recording medium even when the optical axis shift involved with mobility of the objective lens occurs. In addition, the correction element is of a polarization selective type and does not affect a light beam in the outgoing light path but only in the return light path and thus can be installed on an actuator and provided in the light path common in the outgoing light path and the return light path.

The correction element 6 for reducing the cross talk between layers installed on the optical pickup of Embodiment 1 is described in detail below.

The correction element 6 for reducing the cross talk between layers which has a macro structure illustrated in (a) of FIG. 4 transmits a light beam having a P polarization component and creates, for example, a phase difference of $\pi$ between the area a and the area b of (a) of FIG. 4 for a light beam having an S polarization component.

FIG. 7 is an enlarged diagram illustrating the correction element for reducing cross talk between layers. In FIG. 7, a sub-wavelength convexo-concave structures 1A and 2B are incorporated in a periodic structure having a pitch equal to or longer than the wavelength of an incident light beam. The sub-wavelength convexo-concave structure 1A has a groove direction along the S polarization direction and a pitch equal to or shorter than the wavelength of an incident light beam. The sub-wavelength convexo-concave structure 2B has a groove direction along the P polarization direction and a pitch equal to or shorter than the wavelength of an incident light beam.

In FIG. 7, q1 represents the pitch of the sub-wavelength convexo-concave structure 1A.

m1 represents the width of the convex portion of the sub-wavelength convexo-concave structure 1A.

m1/q1 is referred to as a filling factor and used in calculation of the diffraction efficiency described later.

q2 represents the pitch of the sub-wavelength convexo-concave structure 2B.

m2 represents the width of the convex portion of the sub-wavelength convexo-concave structure 2B.

m2/q2 is referred to as a filling factor and used in calculation of the diffraction efficiency described later.

d1 represents the depth of the groove of the sub-wavelength convexo-concave structure 1A.

d2 represents the depth of the groove of the sub-wavelength convexo-concave structure 2B.

When the effective refractive indices of the two kinds of sub-wavelength structure are the same, the two kinds of sub-wavelength structure are sensitive to the polarization direction.

The correction element 6 for reducing the cross talk between layers has sub-wavelength convexo-concave structures having a pitch q1 and q2 equal to or shorter than the wavelength of an incident light as illustrated in FIG. 7. These sub-wavelength convexo-concave structures are sensitive to the phase difference between the P polarization component and S polarization component. Therefore, the correction element 6 for reducing the cross talk between layers transmits an incident light beam of P polarization component as an outgoing light beam in a dead band manner and is sensitive to the phase difference for a light beam having S polarization component as a return light beam and divides the light amount distribution of the return light on the light reception element.

The sub-wavelength convexo-concave structure formed on the surface of the correction element 6 for reducing the cross talk between layers demonstrates the known structural double refraction. The structural double refraction is that when two kinds of media having a different refraction index are arranged in a striping manner with a cyclie shorter than the wavelength of light, polarization component (TE wave) parallel to the stripe and polarization component (TM wave) vertical to the stripe have a different refraction index, which causes double refraction.

Assume that air and a medium having a refraction index of n are taken as the two media for the sub-wavelength convexo-concave structure. The two media have different refraction indices and a light beam having a wavelength at least twice the pitch of the sub-wavelength convexo-concave structure vertically enters into the sub-wavelength convexo-concave structure. The effective refraction ratio of the sub-wavelength convexo-concave structure is provided by the relationship (1) or (2) depending on whether the polarization direction of the incident light beam is parallel (TE wave direction) or perpendicular (TM wave direction) to the groove of the sub-wavelength convexo-concave structure.

$$n(TE) = \sqrt{t \times n^2 + (1-t)} \qquad \text{Relationship (1)}$$

$$n(TM) = \sqrt{\frac{t}{n^2} + (1-t)} \qquad \text{Relationship (2)}$$

n(TE) is an effective refraction index when the polarization direction of an incident light beam is parallel to the groove of the sub-wavelength convexo-concave structure and n(TM) is an effective refraction index when the polarization direction of an incident light beam is perpendicular to the groove of the sub-wavelength convexo-concave structure. The reference character t represents the filling factor described above.

FIG. 8 represents a graph illustrating the refraction index by the polarization direction against the filling factor and shows an example of the calculation results of respective refraction indices. For calculation, 2.313 and 405 nm are assigned for n and the wavelength, respectively.

The filling factors t of FIG. 7 are as follows.

The filling factor t1 of the sub-wavelength convexo-concave structure 1A is represented by the relationship (3).

$$t1 = \frac{m1}{q1} \qquad \text{Relationship (3)}$$

The filling factor t2 of the sub-wavelength convexo-concave structure 2B is represented by the relationship (4).

$$t2 = \frac{m2}{q2} \qquad \text{Relationship (4)}$$

Therefore, the effective refraction indices of respective sub-wavelength convexo-concave structures are as follows:

The effective refraction index {n(TE, 1A)} in the TE direction having the sub-wavelength convexo-concave structure 1A is represented by the relationship (5).

$$n(TE, 1A) = \sqrt{t1 \times n^2 + (1-t1)} \qquad \text{Relationship (5)}$$

The effective refraction index {n(TM, 1A)} in the TM direction having the sub-wavelength convexo-concave structure 1A is represented by the relationship (6).

$$n(TM, 1A) = \sqrt{\frac{t1}{n^2} + (1-t1)}$$

The effective refraction index {n(TE, 2B)} in the TE direction having the sub-wavelength convexo-concave structure 2B is represented by the relationship (7).

$$n(TE, 2B) = \sqrt{t2 \times n^2 + (1-t2)} \qquad \text{Relationship (7)}$$

The effective refraction index {n(TM, 2B)} in the TM direction having the sub-wavelength convexo-concave structure 2B is represented by the relationship (8).

$$n(TM, 2B) = \sqrt{\frac{t2}{n^2} + (1 - t2)}$$ Relationship (8)

The phase difference Ψ (P polarization) between the sub-wavelength convexo-concave structures 1A and 2B when a light beam having a P polarization direction enters is represented by the relationship (9).

ψ(P polarization)=|2π/λ{n(TM,1A)×d1−n(TE,2B)× d2}| Relationship (9)

The phase difference Ψ (S polarization) between the sub-wavelength convexo-concave structures 1A and 2B when a light beam having an S polarization direction enters is represented by the relationship (10).

ψ(S polarization)=|2π/λ{n(TE,1A)×d1−n(TM,2B)× d2}| Relationship (10)

In the relationships (9) and (10), λ represents the wavelength used, and d represents the groove depth of the sub-wavelength convexo-concave structure. The phase difference can be arbitrarily adjusted by suitably selecting a filling factor and a groove depth d.

The correction element 6 for reducing the cross talk between layers transmits a light beam having a P polarization component and imparts, for example, a phase difference of π between the area a and the area b of (a) of FIG. 4, for a light beam having an S polarization component. The phase difference is required to be 0 or 2 nπ (n is an integer) to transmit a light beam of P polarization component in a dead-band manner.

The reason of determining the filling factors of adjacent areas of the multiple areas to substantially equalize effective refractive indices with regard to the polarization direction of the outgoing beam emitted from the light source and impart a phase difference of π with regard to a polarization direction perpendicular to the polarization direction of the outgoing beam emitted from the light source is that a light beam is transmitted in a dead-band manner depending on the polarization direction.

Below is a specific example.

In the case of a medium having an n of 2.313 and the sub-wavelength convexo-concave structures 1A and 2B having the following effective refraction indices:

the filling factor of the sub-wavelength convexo-concave structure 1A: t1=0.70, the filling factor of the sub-wavelength convexo-concave structure 2B: t2=0.30, the effective refraction index of the sub-wavelength convexo-concave structure 1A in the TE direction: n(TE, 1A)=2.011, the effective refraction index of the sub-wavelength convexo-concave structure 1A in the TM direction: n(TM, 1A)=1.523, the effective refraction index of the sub-wavelength convexo-concave structure 2B in the TE direction: n(TE, 2B)=1.518 the effective refraction index of the sub-wavelength convexo-concave structure 2B in the TM direction: n(TM, 2B)=1.150, and the groove depths of the sub-wavelength convexo-concave structures 1A and 2B are equal, the phase difference ψ (P polarization) between the sub-wavelength convexo-concave structures 1A and 2B for a light beam of P polarization direction is substantially equal to zero, and the phase difference ψ (S polarization) between the sub-wavelength convexo-concave structures 1A and 2B for a light beam of S polarization is (2πd/0.405 μm)×(2.011−1.150).

It is preferable that the difference between the effective refraction index of the sub-wavelength convexo-concave structure 1A in the TM direction: n(TM, 1A) and the effective refraction index of the sub-wavelength convexo-concave structure 2B in the TE direction: n(TE, 2B) is equal to zero. However, it is technically difficult considering the refractive index dispersion of a material. Therefore, it is suitable that the difference is within about 0.05.

As described above, the two sub-wavelength convexo-concave structure transmits a light beam having P polarization component in a dead-band manner. In addition, when the groove depth is set to be 0.236 μm, Ψ (S polarization) is π so that the phase step is the maximum.

Furthermore, the correction element for reducing the cross-talk between layers installed on the optical pickup of Embodiment 2 described above is described in detail below. The cross section structure of the correction element is the same as that of Embodiment 1. However, in the correction element 6 of Embodiment 2, a light beam having a wavelength of 405 nm for a light source for a BD or a light beam having a wavelength of 660 nm for a light source for a DVD enters into the correction element 6.

The correction element 6 for reducing the cross talk between layers which has a macro structure illustrated in (a) of FIG. 4 transmits a light beam having a P polarization component and creates, for example, a phase difference of π between the area a and the area b of (a) of FIG. 4 for a light beam having an S polarization component.

FIG. 7 is an enlarged diagram illustrating the correction element for reducing cross talk between layers. This is the same as that of Embodiment 1. In FIG. 7, a sub-wavelength convexo-concave structures 1A and 2B are incorporated in a periodic structure having a pitch equal to or longer than the wavelength of an incident light beam. The sub-wavelength convexo-concave structure 1A has a groove direction along the S polarization direction and a pitch equal to or shorter than the wavelength of an incident light beam. The sub-wavelength convexo-concave structure 2B has a groove direction along the P polarization direction and a pitch equal to or shorter than the wavelength of an incident light beam.

In FIG. 7, q1 represents the pitch of the sub-wavelength convexo-concave structure 1A.

m1 represents the width of the convex portion of the sub-wavelength convexo-concave structure 1A.

m1/q1 is referred to as a filling factor and used in calculation of the diffraction efficiency described later.

q2 represents the pitch of the sub-wavelength convexo-concave structure 2B.

m2 represents the width of the convex portion of the sub-wavelength convexo-concave structure 2B.

m2/q2 is referred to as a filling factor and used in calculation of the diffraction efficiency described later.

d1 represents the depth of the groove of the sub-wavelength convexo-concave structure 1A.

d2 represents the depth of the groove of the sub-wavelength convexo-concave structure 2B.

When the effective refractive indices of the two kinds of sub-wavelength structure are the same, the two kinds of sub-wavelength structure are sensitive to the polarization direction.

The correction element 6 for reducing the cross talk between layers has sub-wavelength convexo-concave structures having a pitch q1 and q2 equal to or shorter than the wavelength of an incident light as illustrated in FIG. 7. These sub-wavelength convexo-concave structures are sensitive to the phase difference between the P polarization component and S polarization component. Therefore, the correction element 6 for reducing the cross talk between layers transmits an incident light beam of P polarization component as an outgoing light beam in a dead band manner and is sensitive to the phase difference for a light beam having S polarization component as a return light beam to divide the light amount distribution of the return light on the light reception element 12.

The sub-wavelength convexo-concave structure formed on the surface of the correction element 6 for reducing the cross talk between layers demonstrates the known structural double refraction. The structural double refraction is that when two kinds of media having a different refraction index are arranged in a striping manner with a cyclic shorter than the wavelength of light, polarization component (TE wave) parallel to the stripe and polarization component (TM wave) vertical to the stripe have a different refraction index, which causes double refraction.

Assume that air and a medium having a refraction index of n are taken as the two media for the sub-wavelength convexo-concave structure. The two media have different refraction indices and a light beam having a wavelength at least twice the pitch of the sub-wavelength convexo-concave structure vertically enters into the sub-wavelength convexo-concave structure. The effective refraction ratio of the sub-wavelength convexo-concave structure is provided by the relationship (11) or (12) depending on whether the polarization direction of the incident light beam is parallel (TE wave direction) or perpendicular (TM wave direction) to the groove of the sub-wavelength convexo-concave structure.

$$n(TE) = \sqrt{t \times n^2 + (1-t)} \qquad \text{Relationship (11)}$$

$$n(TM) = \sqrt{\frac{t}{n^2} + (1-t)} \qquad \text{Relationship (12)}$$

n(TE) is an effective refraction index when the polarization direction of an incident light beam is parallel to the groove of the sub-wavelength convexo-concave structure and n(TM) is an effective refraction index when the polarization direction of an incident light beam is perpendicular to the groove of the sub-wavelength convexo-concave structure. The reference character t represents the filling factor described above.

FIG. 8 represents a graph illustrating the refraction index by the polarization direction against the filling factor and shows an example of the calculation results of respective refraction indices. A refractive index of 2.313 for n(BD) and a wavelength of 405 nm of $Ta_2O_5$ are assigned for calculation.

FIG. 9 represents a graph illustrating the refraction index by the polarization direction against the filling factor and shows an example of the calculation results of respective refraction indices. A refractive index of 2.147 for n(DVD) and a wavelength of 660 nm of $Ta_2O_5$ are assigned for calculation.

The filling factors t of FIG. 7 are as follows.

The filling factor t1 of the sub-wavelength convexo-concave structure 1A is represented by the relationship (13).

$$t1 = \frac{m1}{q1} \qquad \text{Relationship (13)}$$

The filling factor t2 of the sub-wavelength convexo-concave structure 2B is represented by the relationship (14).

$$t2 = \frac{m2}{q2} \qquad \text{Relationship (13)}$$

Therefore, the effective refraction indices of respective sub-wavelength convexo-concave structures are as follows:

The effective refraction index {n(TE, BD1A)} in the TE direction having the sub-wavelength convexo-concave structure 1A is represented by the relationship (15) when a BD is used.

$$n(TE, BD1A) = \sqrt{t1 \times n(BD)^2 + (1-t1)} \qquad \text{Relationship (15)}$$

The effective refraction index {n(TM, BD1A)} in the TM direction having the sub-wavelength convexo-concave structure 1A is represented by the relationship (16) when a BD is used.

$$n(TM, BD1A) = \sqrt{\frac{t1}{n(BD)^2} + (1-t1)} \qquad \text{Relationship (16)}$$

The effective refraction index {n(TE, BD2B)} in the TE direction having the sub-wavelength convexo-concave structure 2B is represented by the relationship (17) when a BD is used.

$$n(TB, BD2B) = \sqrt{t2 \times n(BD)^2 + (1-t2)} \qquad \text{Relationship (17)}$$

The effective refraction index {n(TM, BD2B)} in the TM direction having the sub-wavelength convexo-concave structure 2B is represented by the relationship (18) when a BD is used.

$$n(TM, BD2B) = \sqrt{\frac{t2}{n(BD)^2} + (1-t2)} \qquad \text{Relationship (18)}$$

The effective refraction index {n(TE, DVD1A)} in the TE direction having the sub-wavelength convexo-concave structure 1A is represented by the relationship (19) when a DVD is used.

$$n(TE, DVD1A) = \sqrt{t1 \times n(DVD)^2 + (1-t1)} \qquad \text{Relationship (19)}$$

The effective refraction index {n(TM, DVD1A)} in the TM direction having the sub-wavelength convexo-concave structure 1A is represented by the relationship (20) when a DVD is used.

$$n(TM, DVD1A) = \sqrt{\frac{t1}{n(DVD)^2} + (1-t1)} \qquad \text{Relationship (20)}$$

The effective refraction index {n(TE, DVD2B)} in the TE direction having the sub-wavelength convexo-concave struc ture 2B is represented by the relationship (21) when a DVD is used.

$$n(TE, DVD2B) = \sqrt{t2 \times n(DVD)^2 + (1-t2)} \quad \text{Relationship (21)}$$

The effective refraction index {n(TM, DVD2B)} in the TM direction having the sub-wavelength convexo-concave structure 2B is represented by the relationship (22) when a DVD is used.

$$n(TM, DVD2B) = \sqrt{\frac{t2}{n(DVD)^2} + (1-t2)} \quad \text{Relationship (22)}$$

The phase difference is as follows:

The phase difference {Ψ(BD, P polarization)} between the sub-wavelength convexo-concave structures 1A and 2B when a light beam having a P polarization direction enters into a BD is represented by the relationship (23).

$$\psi(BD, P \text{ polarization}) = |2\pi/405 \text{ nm } \{(n(TM, BD1A) \times d1 - n(TE, BD2B) \times d2)\}| \quad \text{Relationship (23)}$$

The phase difference {Ψ(BD, S polarization)} between the sub-wavelength convexo-concave structures 1A and 2B when a light beam having an S polarization direction enters into a BD is represented by the relationship (24).

$$\psi(BD, S \text{ polarization}) = 2\pi/405 \text{ nm } \{(n(TE, BD1A) \times d1 - n(TM, BD2B) \times d2)\}| \quad \text{Relationship (24)}$$

The phase difference {Ψ(DVD, P polarization)} between the sub-wavelength convexo-concave structures 1A and 2B when a light beam having a P polarization direction enters into a DVD is represented by the relationship (25).

$$\psi(DVD, P \text{ polarization}) = |2\pi/660 \text{ nm } \{(n(TM, DVD1A) \times d1 - n(TE, DVD 2B) \times d2)\}| \quad \text{Relationship (25)}$$

The phase difference {Ψ(DVD, S polarization)} between the sub-wavelength convexo-concave structures 1A and 2B when a light beam having an S polarization direction enters into a DVD is represented by the relationship (26).

$$\psi(DVD, S \text{ polarization}) = |2\pi/660 \text{ nm } \{(n(TE, DVD1A) \times d1 - n(TM, DVD2B) \times d2)\}| \quad \text{Relationship (26)}$$

In the relationships (23) to (26), d represents the groove depth of the sub-wavelength convexo-concave structure. The phase difference can be arbitrarily adjusted by suitably selecting a filling factor and a groove depth d.

In addition, with an attention to the light source wavelength of 405 nm for a BD, specific calculation examples are demonstrated as follows. The correction element 6 for reducing the cross talk between layers transmits a light beam having a P polarization component and creates, for example, a phase difference of π between the area a and the area b of (a) of FIG. 4 for a light beam having an S polarization component. The phase difference is required to be 0 or 2 nπ (n is an integer) to transmit a light beam of P polarization component in a dead-band manner.

In the case of a medium having an n of 2.313 and the sub-wavelength convexo-concave structures 1A and 2B having the following effective refraction indices:
the filling factor of the sub-wavelength convexo-concave structure 1A: t1=0.70,
the filling factor of the sub-wavelength convexo-concave structure 2B: t2=0.30,
the effective refraction index of the sub-wavelength convexo-concave structure 1A in the TE direction: n(TE, BD1A)= 2.011,
the effective refraction index of the sub-wavelength convexo-concave structure 1A in the TM direction: n(TM, BD1A)= 1.523,
the effective refraction index of the sub-wavelength convexo-concave structure 2B in the TE direction: n(TE, BD2B)= 1.518
the effective refraction index of the sub-wavelength convexo-concave structure 2B in the TM direction: n(TM, BD2B)= 1.150,
and the groove depths of the sub-wavelength convexo-concave structures 1A and 2B are equal to d, the phase difference T(BD, P polarization) between the sub-wavelength convexo-concave structures 1A and 2B for a light beam of P polarization direction is substantially equal to zero, and the phase difference Ψ(BD, S polarization) between the sub-wavelength convexo-concave structures 1A and 2B for a light beam of S polarization is (2πd/0.405 μm)×(2.011− 1.150).

It is preferable that the difference between the effective refraction index of the sub-wavelength convexo-concave structure 1A in the TM direction: n(TM, BD1A) and the effective refraction index of the sub-wavelength convexo-concave structure 2B in the TM direction: n(TM, BD2B) is equal to zero. However, it is technically difficult considering the refractive index dispersion of a material. Therefore, it is suitable that the difference is within about 0.05.

As described above, the two sub-wavelength convexo-concave structure transmits a light beam having P polarization component in a dead-band manner. In addition, when the groove depth is set to be 0.236 μm, Ψ(S polarization) is n so that the phase step is maximum.

Next, with an attention to the light source wavelength of 660 nm for a DVD, specific calculation examples are demonstrated as follows.

In the case of a medium having an n of 2.147 and the sub-wavelength convexo-concave structures 1A and 2B having the following effective refraction indices:
the filling factor of the sub-wavelength convexo-concave structure 1A: t1=0.70,
the filling factor of the sub-wavelength convexo-concave structure 2B: t2=0.30,
the effective refraction index of the sub-wavelength convexo-concave structure 1A in the TE direction: n(TE, DVD1A)= 1.878,
the effective refraction index of the sub-wavelength convexo-concave structure 1A in the TM direction: n(TM, DVD1A)=1.488,
the effective refraction index of the sub-wavelength convexo-concave structure 2B in the TE direction: n(TE, DVD2B)= 1.443
the effective refraction index of the sub-wavelength convexo-concave structure 2B in the TM direction: n(TM, DVD2B)=1.143,
and the groove depths of the sub-wavelength convexo-concave structures 1A and 2B are equal to d, the phase difference Ψ(DVD, P polarization) between the sub-wavelength convexo-concave structures 1A and 2B for a light beam of P polarization direction is substantially equal to zero, and the phase difference Ψ(BD, S polarization) between the sub-wavelength convexo-concave structures 1A and 2B for a light beam of S polarization is (2π/0.236 μm)×(0.660 μm)×(1.878−1.143)=0.5 π. Ψ(BD, S polarization) also imparts a phase step corresponding to π/2 in the return path.

It is preferable that the difference between the effective refraction index of the sub-wavelength convexo-concave structure 1A in the TM direction: n(TM, DVD1A) and the effective refraction index of the sub-wavelength convexo-concave structure 2B in the TE direction: n(TE, DVD2B) is equal to zero. However, it is technically difficult considering the refractive index dispersion of a material. Therefore, it is suitable that the difference is within about 0.05.

As described above, the two sub-wavelength convexo-concave structure transmits a light beam having P polarization component in a dead-band manner.

Next, the build process of the correction elements of each Example described above is described below. First, a method of manufacturing a design of the correction element is described prior to manufacturing of the correction element.

(a) to (d) of FIG. 10 are process drawings to describe a method of manufacturing a design using quartz as the base material. In FIG. 18A, a basal plate is formed of a quartz material 55 and a resist 56 for drawing an electron beam 57 is applied with a predetermined thickness to the surface of the quartz material 55 followed by pre-baking. According to the pre-designed program, the electron beam 57 having a pitch and a line width reflecting specifications of a correction element to be manufactured is drawn on the resist 56.

In (b) of FIG. 10, the resist 56 is subject to development and rinsing treatment so that the sub-wavelength convexo-concave structure 58 is formed on the resist 56. The quartz material 55 is exposed on the bottom of the groove.

(C) of FIG. 10 is a diagram illustrating a process drawing of dry-etching the quartz material 55 using the resist pattern of the sub-wavelength convexo-concave structure 58 as a mask. Etching is conducted by an etching device using, for example, RIE (Reactive Ion Etching), NLD (Magnetic Neutral Loop discharge) or TCP (Transformer Coupled Plasma) with $CF_4$ (tetrafluoro methane) gas. Etching is conducted vertically to the plane by applying a bias to the basal board.

(d) of FIG. 10 is a diagram illustrating a process drawing of peeling the resist 56. The resist 51 is peeled by a method in which oxygen gas is introduced and the resist is removed in oxygen gas plasma in the dry-etching device, or a method in which the basal plate is removed from the dry-etching device and the resist is removed by cleansing it with CAROS (a liquid mixture of sulfuric acid and hydrogen peroxide solution). The product is used as the quartz type. Reference symbols a, b and d represent a land width (convex portion width), a space width (concave portion width) and a depth of the concave portion.

In addition, (a) to (d) of FIG. 11 are process drawings to describe a method of manufacturing a design using silicon as the base material. In (a) of FIG. 11, a basal plate is formed of a silicon material 59 and a resist 56 for drawing an electron beam 57 is applied with a predetermined thickness to the surface of the silicon material 56 followed by pre-baking. According to the pre-designed program, the electron beam 57 having a pitch and a line width reflecting specifications of a correction element to be manufactured is drawn on the resist 56.

In (b) of FIG. 11, the resist 56 is subject to development and rinsing treatment so that the sub-wavelength convexo-concave structure 58 is formed on the resist 56. The silicon material 59 is exposed on the bottom of the groove.

(c) of FIG. 11 is a diagram illustrating a process drawing of alkali wet etching the silicon material 59 with a KOH solution using the resist pattern of the sub-wavelength convexo-concave structure 58 as a mask. The silicon material 59 is etched in the depth direction as a wall of the plane while the pitch of the sub-wavelength convexo-concave structure 58 is maintained. A dry-etching method using Bosch process can be suitably used to make the same structure.

(d) of FIG. 11 is a diagram illustrating a process drawing of peeling off the resist 56. The product is used as the silicon type.

The thus manufactured quartz type and silicon type are also referred to as a mold for convenience.

(a) to (g) of FIG. 12 are process drawings illustrating the procedure of filming $Ta_2O_5$ on a glass substrate and forming a correction element on the $Ta_2O_5$ film.

(a) of FIG. 12 is a diagram illustrating a process of forming a $Ta_2O_5$ film (tantalum pentaoxide film) on the surface of a glass substrate.

The $Ta_2O_5$ film is formed by a sputtering method under the following conditions:
1. Substrate temperature: 70 to 100° C.
2. Pressure during film forming: 5 to $8\times10^{-4}$ Torr
3. Film forming speed: 0.7 to 1.0 Å/sec
4. RF power: 300 to 500 W.

(b) of FIG. 12 is a diagram illustrating a process of applying a UV curing resin on the $Ta_2O_5$ film and pressing the $Ta_2O_5$ film with a mold from above. The silicon type and the quartz type can be both used as the mold and the quartz type is more suitable for a nano imprint which forms a fine structure than the silicon type since the quartz type is light transmissible. Grandic RC8790 (manufactured by DIC Corporation) is used as the UV curing resin.

(c) of FIG. 12 is a diagram illustrating a process of irradiating the back of the mold with ultraviolet to cure (harden) the UV curing resin. When the silicon type is used as the mold, ultraviolet is caused to enter from the glass substrate side.

(d) of FIG. 12 is a diagram illustrating a process of peeling off (releasing) the mold. A convex fine structure is formed on the UV curing resin on the glass substrate. (e) of FIG. 12 is a diagram illustrating a process of dry-etching the resin until the $Ta_2O_5$ film is exposed. The dry-etching is conducted under the following conditions:
1. Gas: Oxygen ($O_2$)
2. Flow amount of gas: 20 sccm
3. Pressure: 0.4 Pa
4. Resin etching speed: 30 nm/sec
5. Upper part bias voltage: 1 kW
6. Lower part bias voltage: 60 W.

(f) of FIG. 12 is a diagram illustrating a process of dry-etching until the groove of $Ta_2O_5$ has a desired depth. This dry-etching is conducted under the following conditions:
1. Gas: $CHF_3$ (trifluoromethane) and Ar (argon)
2. Flow amount of gas: Ar: 5 sccm
   $CHF_3$: 20 sccm
3. Pressure: 0.3 Pa
4. $Ta_2O_5$ etching speed: 8 nm/sec
5. Upper part bias voltage: 1 kW
6. Lower part bias voltage: 400 W.

Finally, the resin mask remaining on the uppermost part is peeled off by dry-etching in oxygen gas (plasma).

(g) of FIG. 12 is a diagram illustrating a manufactured correction element formed of tantalum pentaoxide on the glass substrate.

In addition, (a) to (i) of FIG. 13 are process drawings illustrating a procedure of forming a diffraction element on the glass substrate using a silicon film and a mold.

(a) of FIG. 13 is a diagram illustrating a process of forming a silicon (Si) film on the surface of a glass substrate. The silicon film is formed by a sputtering method under the following conditions:
1. Substrate temperature: 70 to 100° C.
2. Pressure during film forming: 7 to $8\times10^{-4}$ Torr
3. Film forming speed: 0.5 to 1.0 Å/sec
4. RF power: 100 to 200 W.

(b) of FIG. 13 is a diagram illustrating a process of applying a UV curing resin on the silicon film and pressing the silicon film with a mold from above. The silicon type and the quartz type can be both used as the mold and the quartz type is more suitable for a nano imprint which forms a fine structure than the silicon type since the quartz type is light transmissible. Grandic RC8790 (manufactured by DIC Corporation) is used as the UV curing resin.

(c) of FIG. 13 is a diagram illustrating a process of irradiating the back of the mold with ultraviolet to cure (harden) the UV curing resin. When the silicon type is used as the mold, ultraviolet enters from the glass substrate side.

(d) of FIG. 13 is a diagram illustrating a process of peeling off (releasing) the mold. A convex fine structure is formed on the UV curing resin on the glass substrate.

(e) of FIG. 13 is a diagram illustrating a process of dry-etching the resin until the silicon film is exposed. The dry-etching is conducted under the following conditions:
1. Gas: Oxygen ($O_2$)
2. Flow amount of gas: 20 sccm
3. Pressure: 0.4 Pa
4. Resin etching speed: 30 nm/sec
4. Upper part bias voltage: 1 kW
6. Lower part bias voltage: 60 W.

(f) of FIG. 13 is a diagram illustrating a process of dry-etching the silicon film and the resin until the glass substrate is exposed. This dry-etching is conducted under the following conditions:
1. Gas: $CHF_3$ (trifluoromethane) and $SF_6$ (sulfur hexaoxide)
2. Flow amount of gas: $SF_6$: 20 sccm
   $CHF_3$: 5 sccm
3. Pressure: 0.3 Pa
4. Resin etching speed: 5 nm/sec
   Silicon etching speed: 30 nm/sec
4. Upper part bias voltage: 1 kW
6. Lower part bias voltage: 50 W.

(g) of FIG. 13 is a diagram illustrating a process of dry-etching until the groove on the glass substrate has a desired depth. This dry-etching is conducted under the following conditions:
1. Gas: $CHF_3$ (trifluoromethane) and Ar (argon)
2. Flow amount of gas: Ar: 5 sccm
   $CHF_3$: 20 sccm
3. Pressure: 0.3 Pa
4. Silicon etching speed: 4 nm/sec
   Glass etching speed: 12 nm/sec
5. Upper part bias voltage: 1 kW
6. Lower part bias voltage: 400 W.

(h) of FIG. 13 is a diagram illustrating a process of peeling off the silicon film remaining on the uppermost part. The silicon mask is wet-peeled with an alkali (KOH) solution.

(i) of FIG. 13 is a diagram illustrating a manufactured correction element formed on one side of the glass substrate.

(a) to (g) of FIG. 14 are process drawings to describe a method of manufacturing a correction element without using a mold.

(a) of FIG. 14 is a diagram illustrating a process of forming a silicon film on the surface of a glass substrate. The silicon film is formed by a sputtering method under the following conditions:
1. Substrate temperature: 70 to 100° C.
2. Pressure during film forming: 7 to $8 \times 10^{-4}$ Torr
3. Film forming speed: 0.5 to 1.0 Å/sec
4. RF power: 100 to 200 W.

(b) of FIG. 14 is a diagram illustrating a process of applying a resist for electron beam on the silicon film.

In (c) of FIG. 14, I-line stepper is used by a high precision fine width irradiation device, etc. Subsequent to irradiation, the resist is partially removed after a development process to expose the silicon film. The remaining resist is a mask pattern for the subsequent etching.

(d) of FIG. 14 is a diagram illustrating a process of dry-etching the silicon film until the glass substrate is exposed. The dry-etching is conducted under the following conditions:
1. Gas: $CHF_3$ (trifluoromethane) and $SF_6$ (sulfur hexaoxide)
2. Flow amount of gas: $SF_6$: 20 sccm
   $CHF_3$: 5 sccm
3. Pressure: 0.4 Pa
4. Silicon etching speed: 30 nm/sec
5. Upper part bias voltage: 1 kW
6. Lower part bias voltage: 50 W.

(e) of FIG. 14 is a diagram illustrating a process of dry-etching until the groove on the glass substrate has a desired depth. This dry-etching is conducted under the following conditions:
1. Gas: $CHF_3$ (trifluoromethane) and Ar (argon)
2. Flow amount of gas: Ar: 5 sccm
   $CHF_3$: 20 sccm
3. Pressure: 0.3 Pa
4. Glass etching speed: 12 nm/sec
4. Upper part bias voltage: 1 kW
6. Lower part bias voltage: 400 W.

(f) of FIG. 14 is a diagram illustrating a process of peeling of f the silicon film remaining on the uppermost part. The silicon mask is wet-peeled off with an alkali (KOH) solution.

(g) of FIG. 14 is a diagram illustrating a manufactured correction element formed on one side of the glass substrate.

Embodiment 3

FIG. 15 is a block chart illustrating an optical data processing device of Embodiment 3 of the present invention. As illustrated in FIG. 15, the optical data processing device is a device which records and plays data signals for an optical recording medium 10 and includes an optical pickup 41 corresponding to the optical pickups described above; a spindle motor 48 to rotate the optical recording medium 10; a transfer motor 42 to move the optical pickup 41 to and from the inner and outer circle of the optical recording medium 10; a modulation and demodulation circuit 44 to perform predetermined modulation and demodulation; a servo control circuit 43 to servo-control the optical pickup 41; and a system controller 47 to control the entire optical data processing device.

The servo control circuit 43 controllably drives and rotates the spindle motor 48 at a predetermined rotation number. The optical recording medium 10 to be recorded and played is chucked on the driving axis of the spindle motor 48 and rotationally scanned at a predetermined rotation number by the spindle motor 48 controllably driven by the servo control circuit 43.

When the optical pickup 41 records and plays the data signals against the optical recording medium 10, the optical recording pickup 41 irradiates the rotationally driven optical recording medium 10 with a laser beam and detects the return light beam as described above. This optical pickup 41 is connected to the modulation and demodulation circuit 44. Before data signals are recorded, the data signals are input from an outer circuit 451 modulated by the modulation and demodulation circuit 44 and then supplied to the optical pickup 41. According to the signals supplied from the modulation and demodulation circuit 44, the optical pickup 41 irradiates the optical recording medium 10 with a laser beam modulated with regard to the optical intensity.

In addition, when playing data signals, the optical pickup 41 irradiates the rotationally driven optical recording medium 10 with a laser beam having a constant output power and generates play signals from the return light beam. Thereafter, the play signals are supplied to the modulation and demodulation circuit 44.

Furthermore, the optical pickup 41 is also connected to the servo control circuit 43. When recording and playing the data signals, the focus servo signals and the tracking servo signals are generated from the return light beam reflected by the rotationally driven optical recording medium 10 as described above and supplied to the servo control circuit 43.

The modulation and demodulation circuit 44 is connected to the system controller 47 and the outer circuit 45. When data signals are recorded on the optical recording medium 10, the modulation and demodulation circuit 44 receives signals to be recorded on the optical recording medium 10 from the outer circuit 45 under the control of the system controller 47 and modulates the signals in a predetermined manner. The signals modulated by the modulation and demodulation circuit 44 is supplied to the optical pickup 41.

In addition, when data signals on the optical recording medium 10 are read (played), the modulation and demodulation circuit 44 receives the play signals read from the optical recording medium 10 from the optical pickup 41 and demodulates the play signals in a predetermined manner. The demodulated signals demodulated by the modulation and demodulation circuit 44 are output from the modulation and demodulation circuit 44 to the outer circuit 45.

The transfer motor 42 is driven by the control signal from the servo control circuit 43, thereby transferring the optical pickup 41 to a predetermined position along the diameter direction of the optical recording medium 10. That is, the transfer motor 42 is connected to the servo control circuit 43 and controlled thereby.

The servo control circuit 43 controls the transfer motor 42 by which the optical pickup 41 is transferred to a predetermined position facing the optical recording medium 10 under the control of the system controller 47. In addition, the servo control circuit 43 is also connected to the spindle motor 48 and controls the behavior thereof under the control of the system controller 47. That is, the servo control circuit 43 controls the spindle motor 48 to rotationally drive the optical recording medium 10 in a predetermined rotation number when recording or playing data signals on the optical recording medium 10.

In this structure, data on multiple kinds of optical recording media can be recorded or played with high reliability by using the pickup described above.

This document claims priority and contains subject matter related to Japanese Patent Application No. 2008-065722, filed on Mar. 14, 2009, the entire contents of which are incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. An optical pickup comprising:
   a light source;
   a light focus device that focuses an outgoing beam emitted from the light source on a target recording layer of an optical recording medium;
   a diffraction element provided between the light focus device and the light source that diffracts the outgoing beam emitted from the light source into three light beams;
   an optical split element provided between the light focus device and the light source that splits a return light beam from the optical recording medium via the light focus device;
   a ¼ wavelength board provided between the light focus device and the optical split element that imparts an optical phase difference of ¼ wavelength to the outgoing light beam;
   a light reception device that receives the return light beam split at the optical split element at a receiving position; and
   a correction element provided between the light reception device and the light focus device that reduces an amount of an interfering light beam received at the reception device caused by an adjacent recording layer adjacent to the target recording layer,
   wherein the correction element is divided into multiple areas in a surface vertical to an optical axis,
   wherein each area of the multiple areas has a sub-wavelength convexo-concave structure having a pitch equal to or shorter than a wavelength of the outgoing light beam and the sub-wavelength convexo-concave structures of the multiple areas adjacent to each other have groove directions perpendicular to each other, and
   wherein filling factors of adjacent areas of the multiple areas are determined to substantially equalize effective refractive indices with regard to the polarization direction of the outgoing beam emitted from the light source and impart a phase difference of $\pi$ with regard to a polarization direction perpendicular to the polarization direction of the outgoing beam emitted from the light source.

2. An optical pickup comprising:
   a first light source that emits a light beam having a wavelength of $\lambda 1$;
   a second light source that emits a light beam having a wavelength of $\lambda 2$ longer than $\lambda 1$;
   a light focus device that focuses the light beam emitted from the first light source and the second light source on one of multiple recording layers of an optical recording medium;
   a diffraction element provided between the light focus device and the first light source that diffracts the outgoing beam emitted from the first light source and the second light source into three light beams,
   an optical split element provided between the light focus device and the first light source and the second light source, that splits a return light beam from the optical recording medium via the light focus device;
   a ¼ wavelength board provided between the light focus device and the optical split element that imparts an optical phase difference of ¼ wavelength to the outgoing light beam;
   a light reception device that receives the return light beam split at the optical split element at a receiving position; and
   a correction element provided between the light reception device and the light focus device that reduces an amount of an interfering light beam received at the reception device caused by adjacent layers to the one of multiple recording layers,
   wherein the correction element is divided into multiple areas in a surface vertical to an optical axis, wherein each area of the multiple areas has a sub-wavelength convexo-concave structure having a pitch equal to or shorter λ1 and the sub-wavelength convexo-concave structures of the multiple areas adjacent to each other have groove directions perpendicular to each other, and wherein filling factors of adjacent areas of the multiple areas are determined to substantially equalize effective refractive indices with regard to the polarization direction of the outgoing beam emitted from the light source and impart a phase difference of $\pi$ with regard to a polarization direction perpendicular to the polarization direction of the outgoing beam emitted from the light source.

3. An optical data processing device comprising:
a spindle motor;
a servo control circuit;
a system controller; and
the optical pickup of claim 1.

* * * * *